(12) United States Patent
Jeong et al.

(10) Patent No.: US 11,448,334 B2
(45) Date of Patent: Sep. 20, 2022

(54) DOUBLE 6-WAY VALVE FOR VEHICLE COOLING SYSTEM

(71) Applicants: HYUNDAI MOTOR COMPANY, Seoul (KR); KIA CORPORATION, Seoul (KR)

(72) Inventors: Seong Bin Jeong, Hwaseong-si (KR); Hyun Jae Lee, Seongnam-si (KR); Jae Eun Jeong, Hwaseong-si (KR); Wan Je Cho, Hwaseong-si (KR); Tae Hee Kim, Hwaseong-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 0 days.

(21) Appl. No.: 17/343,981

(22) Filed: Jun. 10, 2021

(65) Prior Publication Data

US 2022/0163132 A1    May 26, 2022

(30) Foreign Application Priority Data

Nov. 24, 2020 (KR) ........................ 10-2020-0158309

(51) Int. Cl.
*F16K 11/07* (2006.01)
*F16K 31/04* (2006.01)
*F16K 11/076* (2006.01)

(52) U.S. Cl.
CPC .......... *F16K 31/041* (2013.01); *F16K 11/076* (2013.01)

(58) Field of Classification Search
CPC .......................... F16K 11/076; F16K 31/041
See application file for complete search history.

(56) References Cited

U.S. PATENT DOCUMENTS

| 4,399,976 | A | * | 8/1983 | Legris | .................. F16K 5/0668 251/315.08 |
| 9,827,824 | B2 | | 11/2017 | Enomoto et al. | |
| 10,171,337 | B2 | * | 1/2019 | Baron | ................. H04L 41/0816 |
| 10,928,077 | B2 | * | 2/2021 | Arrus | .................... F16K 27/067 |
| 2015/0027572 | A1 | * | 1/2015 | Morein | ............... F16K 11/0876 137/594 |
| 2016/0348797 | A1 | * | 12/2016 | Larsson | ............. F16K 11/0743 |
| 2017/0067665 | A1 | * | 3/2017 | Whitmore | ................ F24F 11/89 |

* cited by examiner

*Primary Examiner* — Kevin R Barss
(74) *Attorney, Agent, or Firm* — Lempia Summerfield Katz LLC

(57) ABSTRACT

A double 6-way valve for a vehicle cooling system provides various modes, reduces the number of parts of the cooling system, and improves packaging, compared to a conventional cooling system. The double 6-way valve includes: an upper housing including a plurality of upper nipples disposed at equal intervals on an outer circumference surface thereof; a lower housing stacked under the upper housing and including a plurality of lower nipples disposed at equal intervals on an outer circumference surface thereof; an upper hub rotatably mounted within the upper housing; a lower hub rotatably mounted within the lower housing and stacked under the upper hub; and a driving apparatus to rotate the upper hub and the lower hub.

18 Claims, 20 Drawing Sheets

DOUBLE 6-WAY VALVE FOR VEHICLE COOLING SYSTEM

CROSS-REFERENCE TO RELATED APPLICATION

This application claims priority to and the benefit of Korean Patent Application No. 10-2020-0158309, filed on Nov. 24, 2020, the entire contents of which are incorporated herein by reference.

FIELD

The present disclosure relates to a double 6-way valve for a vehicle cooling system, and more particularly, to a double 6-way valve for a vehicle cooling system, which enables the number of parts of the cooling system to be reduced, packaging to be improved, and also more various modes to be executed, compared to a conventional cooling system.

BACKGROUND

The statements in this section merely provide background information related to the present disclosure and may not constitute prior art.

In general, as an electric motor is used as a driving source instead of an engine, an electric vehicle further includes an inverter, a battery, an on board charger (OBC), and a low voltage DC-DC converter (LDC) for the driving of the electric motor. Separate cooling circuits are configured using two radiators for effective cooling because the components added as described above have different target cooling temperatures.

A conventional cooling system for an electric vehicle includes a first cooling circuit using a first radiator and a second cooling circuit using a second radiator. Each of the cooling circuits implements various cooling modes depending on a condition (e.g., an external temperature).

However, we have discovered that since the cooling system further includes two or more 3-way valves, a plurality of T tubes, a bypass line, etc. in order to implement various cooling modes, there are problems in that a prime cost and weight are increased, the package complexity of the system is increased, and an implementation of a cooling mode is inefficient compared to the number of valves.

Furthermore, if a separation cooling mode is implemented based on the T tube, for example, if the cooling circuit operates in a battery separation mode, there is a problem in that a high-temperature coolant is not fully blocked in the T tube and a small quantity of the coolant flows into the battery.

The above information disclosed in this Background section is only for enhancement of understanding of the background of the disclosure and accordingly it may contain information that does not form the prior art that is already known to a person of ordinary skill in the art.

SUMMARY

The present disclosure provides a double 6-way valve for a vehicle cooling system, which enables the number of parts of the cooling system to be reduced, packaging to be improved, and also more various modes to be executed, compared to a conventional cooling system.

In one form of the present disclosure, a double 6-way valve for a vehicle cooling system includes: an upper housing provided with a plurality of upper nipples disposed at equal intervals in a circumference direction thereof, on an outer circumference surface thereof, wherein the plurality of upper nipples is coupled to and supported by different parts of the cooling system; a lower housing stacked under the upper housing and provided with a plurality of lower nipples disposed at equal intervals in a circumference direction thereof, on an outer circumference surface thereof, wherein the plurality of lower nipples is coupled to and supported by different parts of the cooling system; an upper hub rotatably mounted within the upper housing; a plurality of upper flow channels independently provided within the upper hub and each coupled to two upper nipples selected depending on a rotation angle of the upper hub, among the plurality of upper nipples, in a way that a coolant flows through each upper flow channel; a lower hub rotatably mounted within the lower housing and stacked under the upper hub; a plurality of lower flow channels independently provided within the lower hub and each coupled to two lower nipples selected depending on a rotation angle of the lower hub, among the plurality of lower nipples, in a way that the coolant flows through each lower flow channel; and a driving apparatus configured to rotate the upper hub and the lower hub.

The plurality of upper flow channels includes a first upper flow channel coupled to two upper nipples selected depending on a rotation angle of the upper hub, among the plurality of upper nipples, and configured to enable the selected two upper nipples to communicate with each other in a way that the coolant flows through the first upper flow channel; a second upper flow channel disposed at a predetermined distance from the first upper flow channel in a circumference direction of the upper hub, coupled to two upper nipples selected depending on a rotation angle of the upper hub, among the plurality of upper nipples, and configured to enable the selected two upper nipples to communicate with each other in a way that the coolant flows through the second upper flow channel; and a third upper flow channel disposed at a predetermined distance from the second upper flow channel in the circumference direction of the upper hub, coupled to remaining two upper nipples not coupled to the first upper flow channel and the second upper flow channel, among the plurality of upper nipples, and configured to enable the remaining two upper nipples to communicate with each other in a way that the coolant flows through the third upper flow channel.

In another form, the plurality of lower flow channels includes a first lower flow channel coupled to two lower nipples selected depending on a rotation angle of the lower hub, among the plurality of lower nipples, and configured to enable the selected two lower nipples to communicate with each other in a way that the coolant flows through the first lower flow channel; a second lower flow channel disposed at a predetermined distance from the first lower flow channel in a circumference direction of the lower hub, coupled to two lower nipples selected depending on a rotation angle of the lower hub, among the plurality of lower nipples, and configured to enable the selected two lower nipples to communicate with each other in a way that the coolant flows through the second lower flow channel; and a third lower flow channel disposed at a predetermined distance from the second lower flow channel in the circumference direction of the lower hub, coupled to remaining two lower nipples not coupled to the first lower flow channel and the second lower flow channel, among the plurality of lower nipples, and configured to enable the remaining two lower nipples to communicate with each other in a way that the coolant flows through the third lower flow channel.

Furthermore, a first upper nipple of the plurality of upper nipples is coupled to an entrance-side coolant line of a first radiator among components of the cooling system. A second upper nipple of the plurality of upper nipples is coupled to an exit-side coolant line of the first radiator among the components of the cooling system.

Furthermore, a third upper nipple of the plurality of upper nipples is coupled to an entrance-side coolant line of a power electronic (PE) part among components of the cooling system. A fourth upper nipple of the plurality of upper nipples is coupled to an exit-side coolant line of the PE part among the components of the cooling system.

Furthermore, a fifth upper nipple of the plurality of upper nipples is coupled to a first entrance-side coolant line of a water cooling type heat exchanger coupled to a first radiator among components of the cooling system. A sixth upper nipple of the plurality of upper nipples is coupled to a first exit-side coolant line of the water cooling type heat exchanger coupled to the first radiator among the components of the cooling system.

Furthermore, a first lower nipple of the plurality of lower nipples is coupled to an entrance-side coolant line of a second radiator among components of the cooling system. A second lower nipple of the plurality of lower nipples is coupled to an exit-side coolant line of the second radiator among the components of the cooling system.

Furthermore, a third lower nipple of the plurality of lower nipples is coupled to an entrance-side coolant line of a battery part among components of the cooling system. A fourth lower nipple of the plurality of lower nipples is coupled to an exit-side coolant line of the battery part among the components of the cooling system.

Furthermore, a fifth lower nipple of the plurality of lower nipples is coupled to a second entrance-side coolant line of a water cooling type heat exchanger coupled to a second radiator among components of the cooling system. A sixth lower nipple of the plurality of lower nipples is coupled to a second exit-side coolant line of the water cooling type heat exchanger coupled to the second radiator among the components of the cooling system.

Furthermore, when the rotation angle of the upper hub is 0°, the first upper flow channel is coupled to a second upper nipple and third upper nipple of the plurality of upper nipples in a way that the coolant flows through the first upper flow channel, the second upper flow channel is coupled to a fourth upper nipple and fifth upper nipple of the plurality of upper nipples in a way that the coolant flows through the second upper flow channel, and the third upper flow channel is coupled to a first upper nipple and sixth upper nipple of the plurality of upper nipples in a way that the coolant flows through the third upper flow channel.

Furthermore, when the rotation angle of the lower hub is 0°, the first lower flow channel is coupled to a second lower nipple and third lower nipple of the plurality of lower nipples in a way that the coolant flows through the first lower flow channel, the second lower flow channel is coupled to a fourth lower nipple and fifth lower nipple of the plurality of lower nipples in a way that the coolant flows through the second lower flow channel, and the third lower flow channel is coupled to a sixth lower nipple and first lower nipple of the plurality of lower nipples in a way that the coolant flows through the third lower flow channel.

Furthermore, a first upper half flow channel and a second upper half flow channel which are independently formed are provided within the upper hub and each extended from an outer circumference surface of the upper hub to the bottom of the upper hub. A first lower half flow channel and a second lower half flow channel which are independently formed are provided within the lower hub and each extended from an outer circumference surface of the lower hub to the top of the lower hub. Depending on rotation angles of the upper hub and the lower hub, the bottom of the first upper half flow channel and the top of the first lower half flow channel are selectively coupled in a way that the coolant flows through the first upper half flow channel and the first lower half flow channel, and the bottom of the second upper half flow channel and the top of the second lower half flow channel are selectively coupled in a way that the coolant flows through the second upper half flow channel and the second lower half flow channel. At the same time, the top of the first upper half flow channel and the top of the second upper half flow channel are coupled to upper nipples selected depending on the rotation angle of the upper hub, respectively, among the plurality of upper nipples, in a way that the coolant flows through the first upper half flow channel and the second upper half flow channel, and the bottom of the first lower half flow channel and the bottom of the second lower half flow channel are coupled to lower nipples selected depending on the rotation angle of the lower hub, respectively, among the plurality of lower nipples in a way that the coolant flows through the first lower half flow channel and the second lower half flow channel.

Furthermore, the top of the first upper half flow channel is coupled to a second upper nipple selected depending on a predetermined rotation angle of the upper hub in a way that the coolant flows through the first upper half flow channel. The top of the second upper half flow channel is coupled to a third upper nipple selected depending on a predetermined rotation angle of the upper hub in a way that the coolant flows through the second upper half flow channel.

Furthermore, the bottom of the first lower half flow channel is coupled to a first lower nipple selected depending on a rotation angle of the lower hub in a way that the coolant flows through the first lower half flow channel. The bottom of the second lower half flow channel is coupled to the second lower nipple selected depending on a rotation angle of the lower hub in a way that the coolant flows through the second lower half flow channel.

Furthermore, a third upper half flow channel and a fourth upper half flow channel which are independently formed are provided within the upper hub and each extended from an outer circumference surface of the upper hub to the bottom of the upper hub. A third lower half flow channel and a fourth lower half flow channel which are independently formed are provided within the lower hub and each extended from an outer circumference surface of the lower hub to the top of the lower hub. Depending on rotation angles of the upper hub and the lower hub, the bottom of the third upper half flow channel and the top of the third lower half flow channel are selectively coupled in a way that the coolant flows through the third upper half flow channel and the third lower half flow channel, and the bottom of the fourth upper half flow channel and the top of the fourth lower half flow channel are selectively coupled in a way that the coolant flows through the fourth upper half flow channel and the fourth lower half flow channel. At the same time, the top of the third upper half flow channel and the top of the fourth upper half flow channel are coupled to upper nipples selected depending on a rotation angle of the upper hub, respectively, among the plurality of upper nipples, in a way that the coolant flows through the third upper half flow channel and the fourth upper half flow channel, and the bottom of the third lower half flow channel and the bottom of the fourth lower half flow channel are coupled to lower nipples selected depending on a rotation angle of the lower hub, respectively, among the plurality of lower nipples in a way that the coolant flows through the third lower half flow channel and the fourth lower half flow channel.

Furthermore, the top of the third upper half flow channel is coupled to a second upper nipple selected depending on a predetermined rotation angle of the upper hub in a way that the coolant flows through the third upper half flow channel. The top of the fourth upper half flow channel is coupled to a first upper nipple selected depending on a rotation angle of the upper hub in a way that the coolant flows through the fourth upper half flow channel.

Furthermore, the bottom of the third lower half flow channel is coupled to a first lower nipple selected depending on a predetermined rotation angle of the lower hub in a way that the coolant flows through the third lower half flow channel. The bottom of the fourth lower half flow channel is coupled to a fifth lower nipple selected depending on a predetermined rotation angle of the lower hub in a way that the coolant flows through the fourth lower half flow channel.

Furthermore, the driving apparatus includes a motor configured to be rotatable in the first direction and the second direction; a first ratchet provided as a structure in which a first latch jaw and a first inclined plane are repeatedly formed on an outer circumference surface thereof in a circumference direction and mounted on a shaft of the motor; a first spring clip configured to have a first end mounted on the upper hub and a second end seated in the first inclined plane in a way to be latched onto the first latch jaw; a second ratchet provided as a structure in which a second latch jaw and a second inclined plane are repeatedly formed on an outer circumference surface thereof in a circumference direction and mounted on the shaft of the motor; and a second spring clip configured to have a first end mounted on the lower hub and a second end seated in the second inclined plane in a way to be latched onto the second latch jaw.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 13:
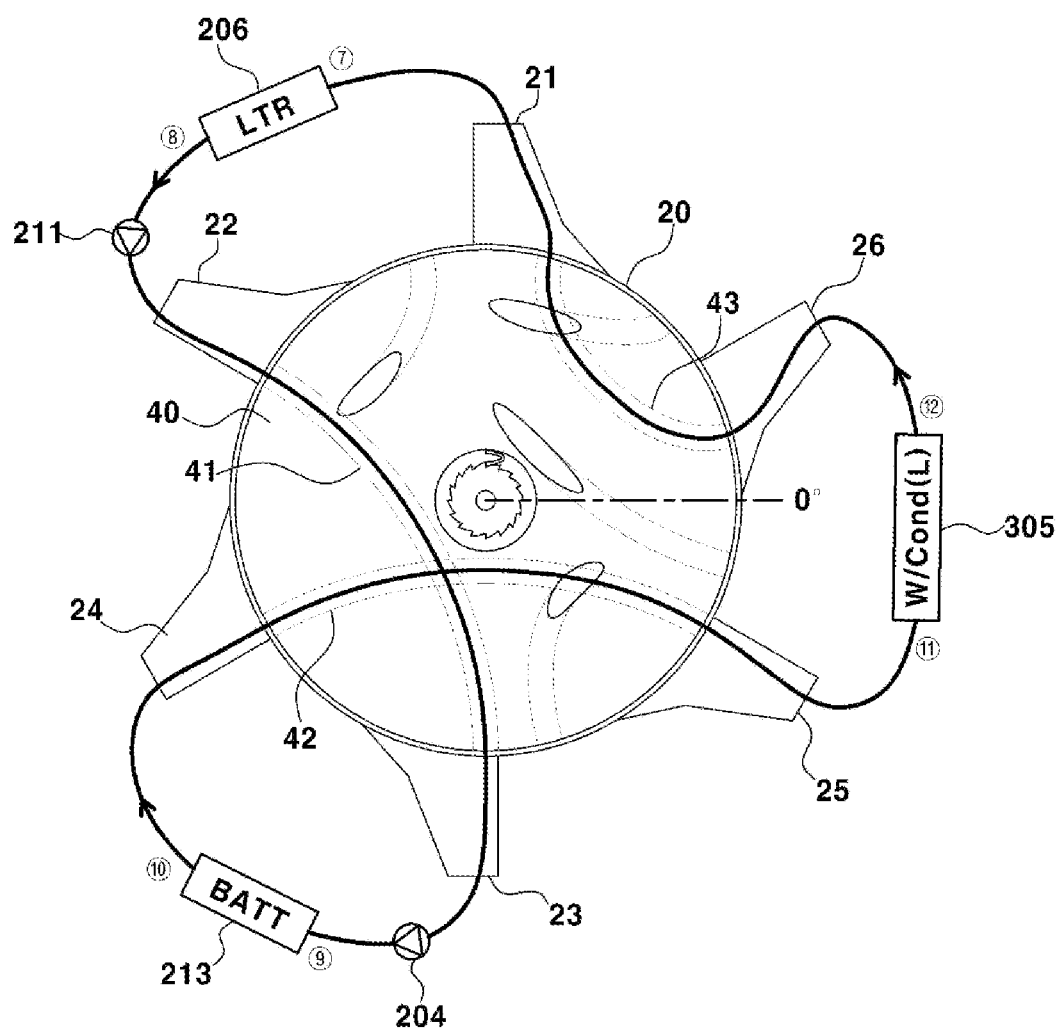
Figure 14:
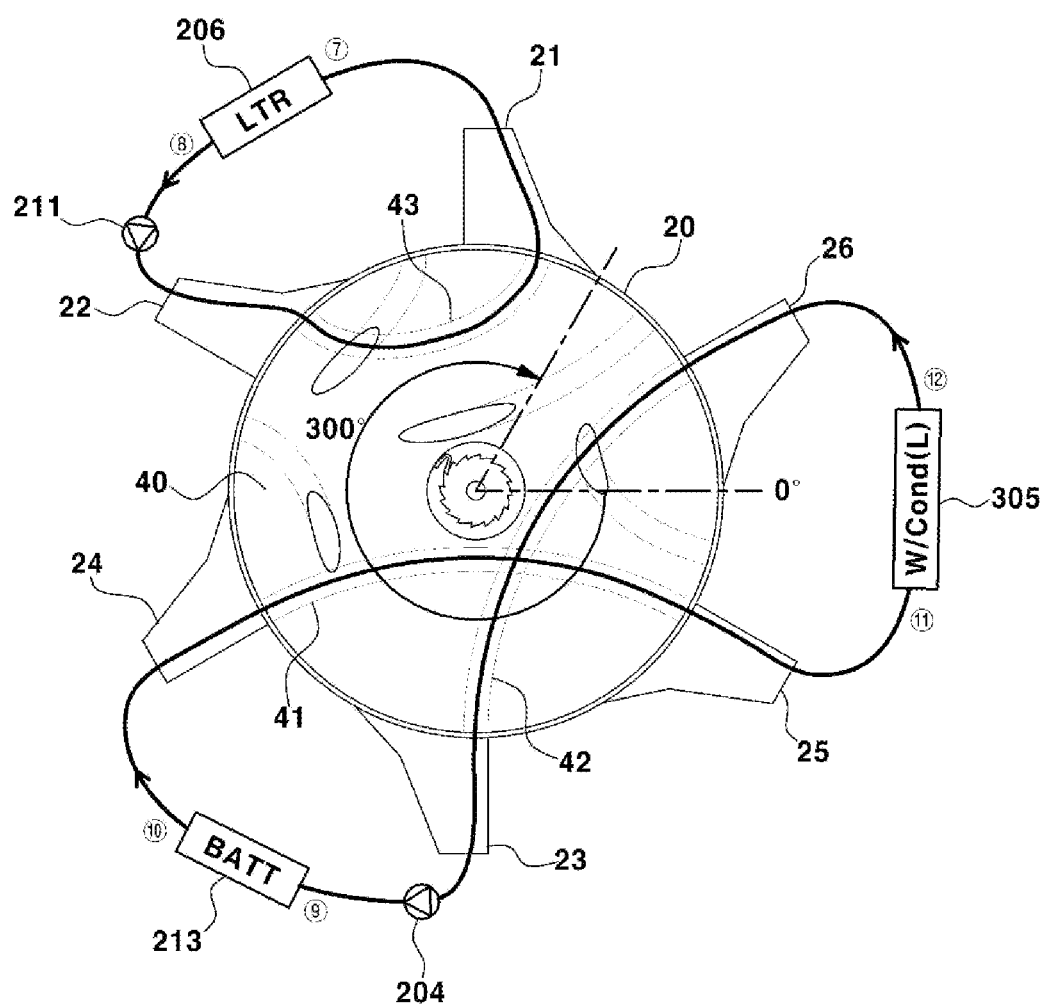
Figure 15:
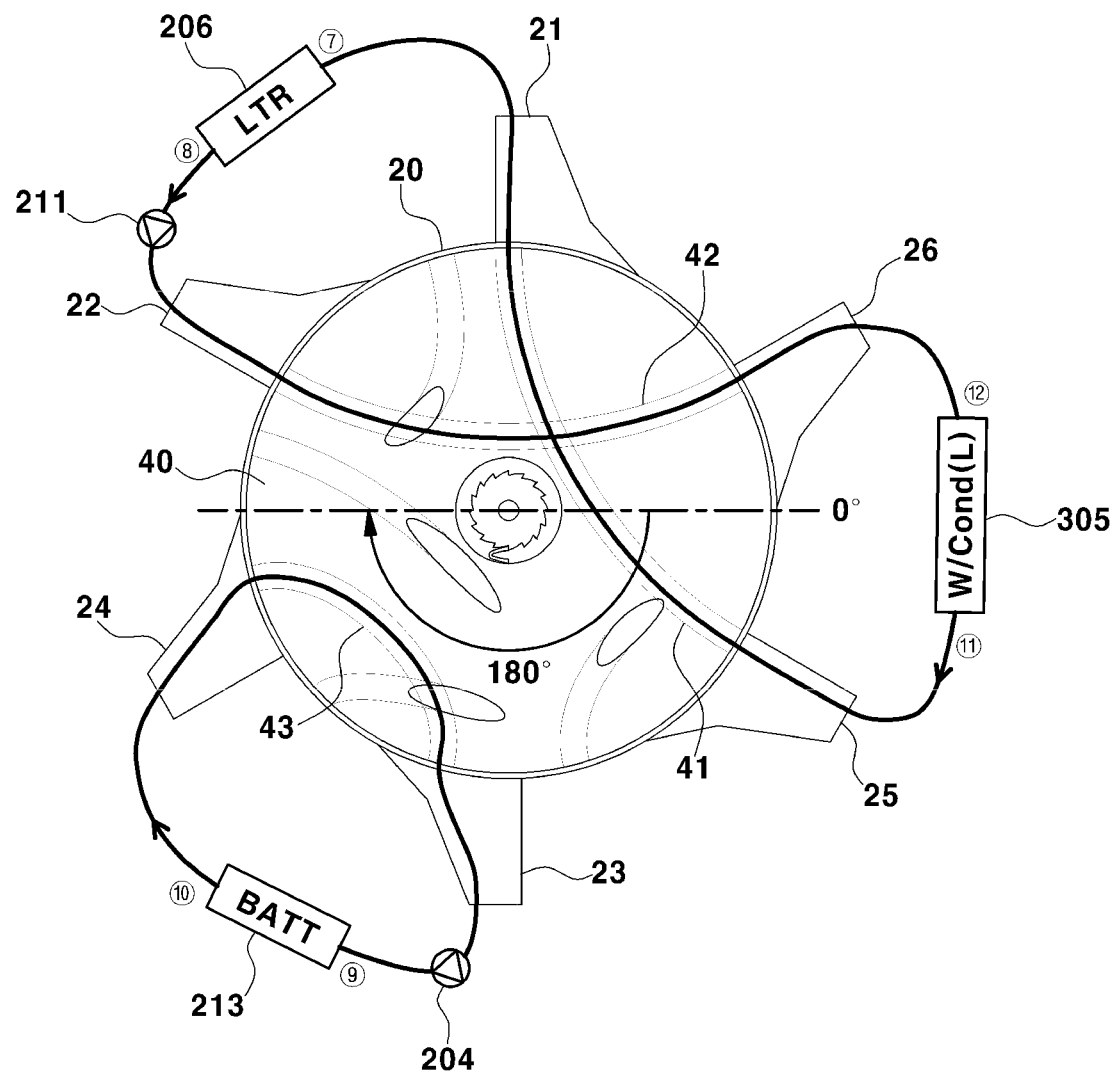

FIGS. 13 to 15 are diagrams respectively illustrating a flow of a coolant according to a rotation angle of a lower hub among the components of the double 6-way valve according to another form of the present disclosure; and FIGS. 16 to 21 are diagrams respectively illustrating an operating state of the upper hub and the lower hub for the matching of an upper half flow channel and a lower half flow channel among the components of the double 6-way valve according to some forms of the present disclosure and a state in which a flow of a coolant according to the operating state is controlled.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Hereinafter, exemplary forms of the present disclosure will be described with reference to the accompanying drawings. The items expressed in the accompanying drawings may be different from forms actually implemented as schematic drawings for easily describing exemplary forms of the present disclosure.

It should be understood that the appended drawings are not necessarily to scale, presenting a somewhat simplified representation of various preferred features illustrative of the basic principles of the disclosure. The specific design features of the present disclosure as disclosed herein, including, for example, specific dimensions, orientations, locations, and shapes will be determined in section by the particular intended application and use environment.

In the entire specification, when it is said that one part "includes" an element, the word "include" will be understood to imply the inclusion of stated parts, not the exclusion of other elements, unless explicitly described to the contrary.

A cooling system for an electric vehicle in one form of the present disclosure is described with reference to FIGS. 1 to 4.

The cooling system for an electric vehicle includes several parts, such as multiple 3-way valves and T type tube, and connection hose types for controlling a flow of a coolant in order to separate and individually cool a power electronic (PE) part and a battery or integrate and cool the PE part and the battery.

Furthermore, the cooling system for an electric vehicle includes the two radiators disposed at the front part of the vehicle and parallel coolant lines each circulating each of the radiators in order to improve mileage and curb weight of the vehicle.

Figure 1:
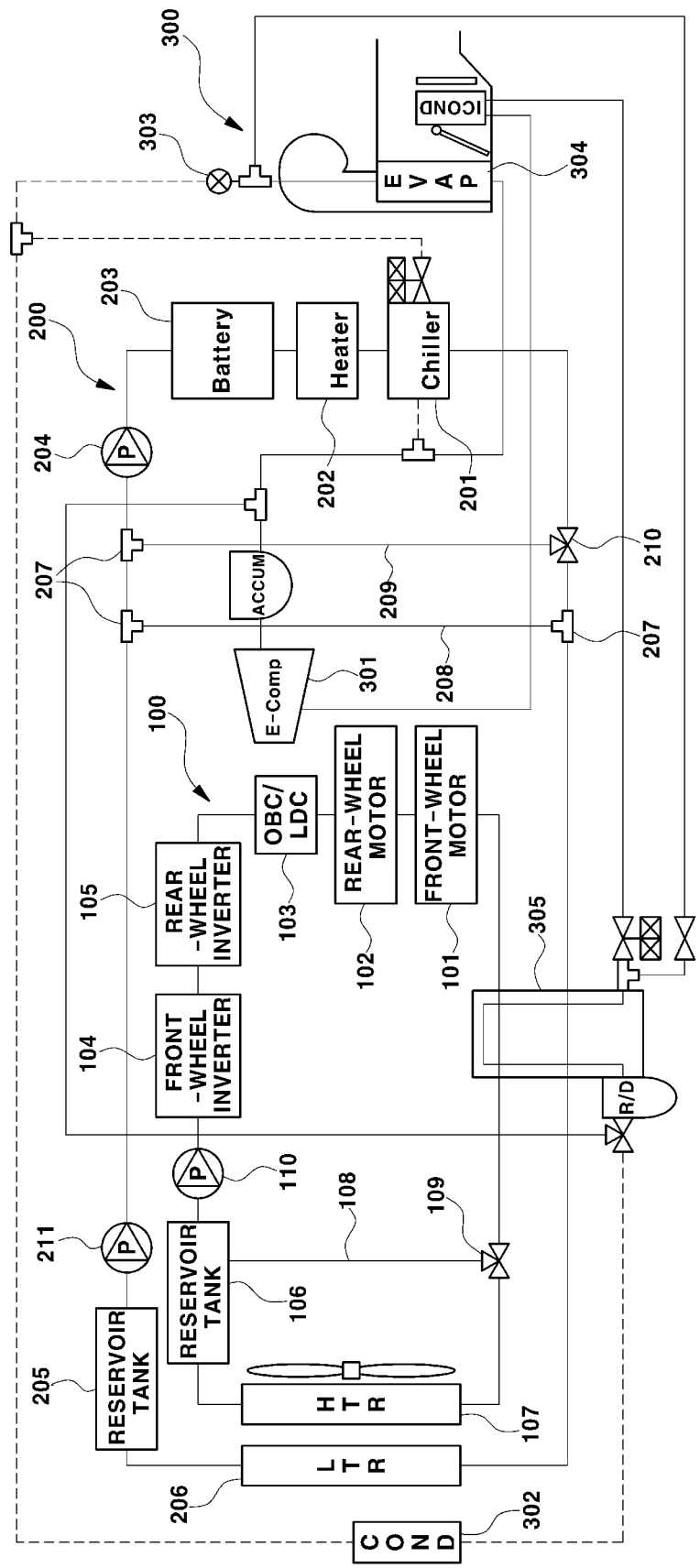
FIG. 1 is a circuit diagram illustrating an example of a cooling system for an electric vehicle.

As illustrated in FIG. 1, the cooling system for an electric vehicle is configured to include a first cooling circuit 100 for the cooling of the PE part, a second cooling circuit 200 for the cooling and heating of a battery part, and an air-conditioning circuit 300 for the cooling and heating inside the vehicle.

A front-wheel motor 101 and a rear-wheel motor 102 for providing a driving force for the vehicle, an on-board charger (OBC)/low voltage DC-DC converter (LDC) 103, a front-wheel inverter 104, a rear-wheel inverter 105, an electric water pump 110, a reservoir tank 106 in which a coolant is stored, a high temperature radiator (HTR) 107, etc. are coupled to the first cooling circuit 100 so that the coolant can circulate therethrough. The HTR 107 may also be referred to as a first radiator.

Furthermore, a first bypass line 108 is coupled between the reservoir tank 106 and the rears of the HTR 107. A first 3-way valve 109 for enabling the coolant to selectively flow is mounted at a point where the first bypass line 108 and a coolant line come into contact with each other.

A chiller 201 for the cooling of the coolant, a coolant heater 202 for the heating of the coolant, a battery 203, electric water pumps 204 and 211, a reservoir tank 205, a low-temperature radiator (LTR) 206, etc. are coupled to the second cooling circuit 200 so that the coolant can circulate therethrough. The LTR 206 may also be referred to as a second radiator.

Furthermore, a second bypass line 208 and a third bypass line 209 are coupled, through the tubes 207, between a coolant line coupled between the exit of the LTR 206 and the battery 203 and a coolant line coupled between the entrance of the LTR 206 and the chiller 201. A second 3-way valve 210 for enabling the coolant to selectively flow is mounted on a point where the third bypass line 209 and the coolant line come into contact with each other.

For reference, the air-conditioning circuit 300 may be an air-conditioning apparatus configured to include a compressor 301 for compressing a refrigerant, an external condenser 302 for liquefying the refrigerant compressed by the compressor 301 by condensing the refrigerant, an expansion valve 303 for rapidly expanding the refrigerant condensed and liquefied by the external condenser 302, an evaporator 304 for evaporating the refrigerant expanded by the expansion valve 303 and simultaneously cooling air ventilated toward the inside of the vehicle using evaporative latent heat of the refrigerant, etc.

Furthermore, a water cooling type heat exchanger 305 for a heat exchange between the coolant and the refrigerant is positioned between the coolant line of the first cooling circuit 100, the coolant line of the second cooling circuit 200, and the refrigerant line of the air-conditioning circuit 300.

Operation modes of the cooling system for an electric vehicle constructed as described above are described as follows.

Heat Pump Mode and Battery Temperature-Rising Mode

Figure 2:
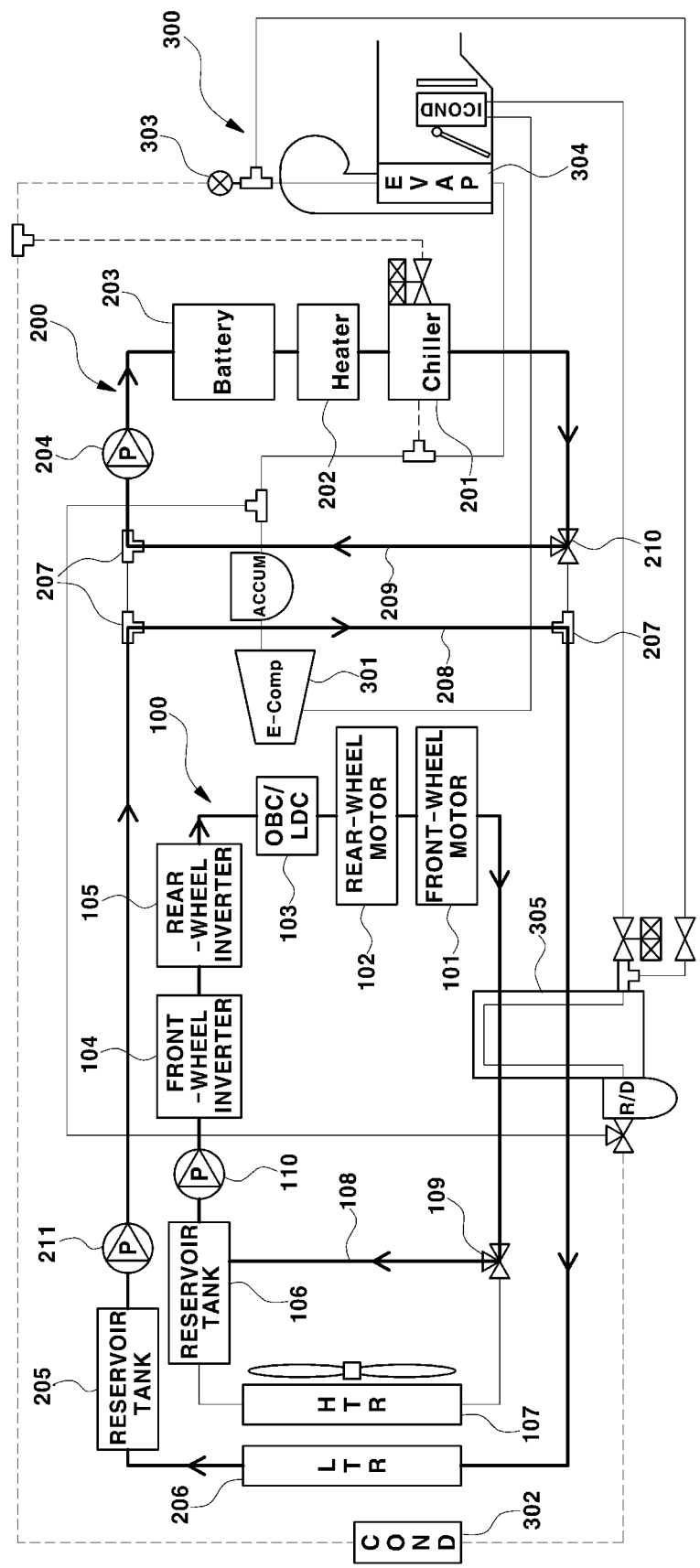
FIG. 2 is a circuit diagram illustrating a flow of a coolant when the cooling system is in a heat pump mode and a battery temperature-rising mode.

FIG. 2 illustrates a flow state of the coolant when the cooling system for an electric vehicle is in the heat pump mode and the battery temperature-rising mode.

The heat pump mode refers to a mode for recovering waste heat from a PE part 212, including the front-wheel motor 101, the rear-wheel motor 102, the OBC/LDC 103, the front-wheel inverter 104, and the rear-wheel inverter 105.

In the heat pump mode, the cooling system becomes a state in which the HTR 107 is separated so that the coolant does not flow toward the HTR 107, as may be seen from FIG. 2, because a cooling action of the HTR 107 among the components of the first cooling circuit 100 is unnecessary.

To this end, the first 3-way valve 109 mounted at the point where the first bypass line 108 and the coolant line come into contact with each other is shut against the HTR 107 and simultaneously opened toward the first bypass line 108.

Accordingly, the coolant within the reservoir tank 106 recovers waste heat while performing a circulation flow in which the coolant sequentially passes through the front-wheel motor 101, the rear-wheel motor 102, the OBC/LDC 103, the front-wheel inverter 104, and the rear-wheel inverter 105, which constitute the PE part, by the driving of the electric water pump 110.

The battery temperature-rising mode refers to a mode in which if a temperature rise for the battery 203 is desired, the coolant heater 202 operates to heat the coolant and the battery 203 is heated by the heated coolant.

In the battery temperature-rising mode, the cooling system becomes a state in which the LTR 206 is separated so that the coolant does not flow toward the LTR 206, as may be seen from FIG. 2, because a cooling action of the LTR 206 among the components of the second cooling circuit 200 is unnecessary.

To this end, the second 3-way valve 210 mounted at the point where the third bypass line 209 and the coolant line come into contact with each other is shut against the LTR 206 and simultaneously opened toward the third bypass line 209.

Accordingly, the coolant heated by the coolant heater 202 performs a circulation flow in which the coolant passes through the second 3-way valve 210 and the battery 203 via the third bypass line 209, thus raising a temperature of the battery. At this time, the coolant heated by the coolant heater 202 implements a circulation flow in which the coolant passes through the battery 203 by the driving of the electric water pump 204.

Integrated Cooling Mode

Figure 3:
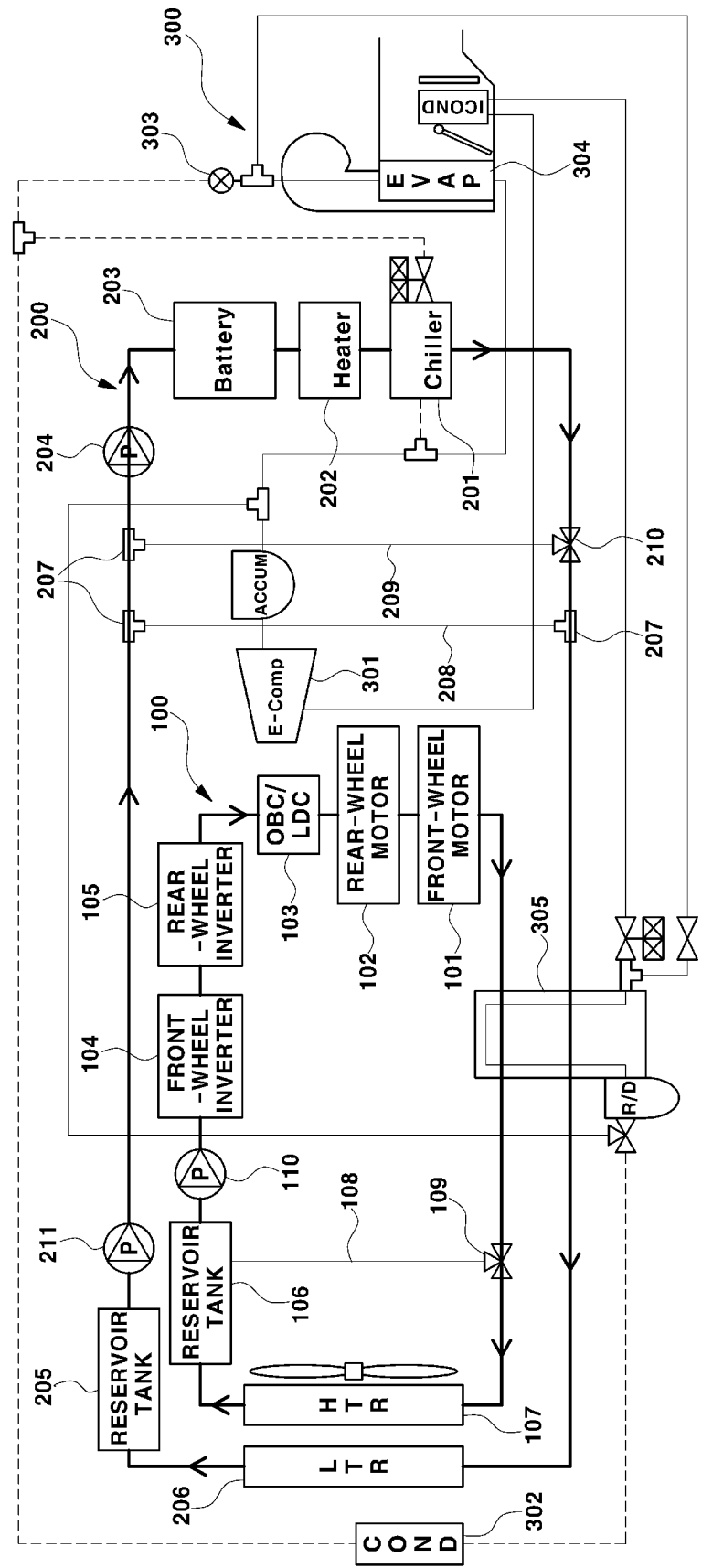
FIG. 3 is a circuit diagram illustrating a flow of a coolant when the cooling system is in an integrated cooling mode.

FIG. 3 illustrates a flow state of the coolant when the cooling system for an electric vehicle is in the integrated cooling mode.

The integrated cooling mode refers to a mode in which the first cooling circuit 100 cools the PE part, including the front-wheel motor 101, the rear-wheel motor 102, the OBC/LDC 103, the front-wheel inverter 104, the rear-wheel inverter 105, using the HTR 107 and the second cooling circuit 200 cools the battery 203 using the LTR 206.

In the integrated cooling mode, the cooling system becomes a state in which the HTR 107 is integrated so that the coolant flows toward the HTR 107, as may be seen from FIG. 3, because a cooling action of the HTR 107 among the components of the first cooling circuit 100 is desired and becomes a state in which the LTR 206 is integrated so that the coolant flows toward the LTR 206, as may be seen from FIG. 3, because the cooling action of the LTR 206 among the components of the second cooling circuit 200 is desired.

To this end, the first 3-way valve 109 is opened toward the HTR 107 and simultaneously shut against the first bypass line 108. The second 3-way valve 210 is opened toward the LTR 206 and simultaneously shut against the third bypass line 209.

Accordingly, in the first cooling circuit 100, the coolant performs a heat exchange for cooling the PE part, including the front-wheel motor 101, the rear-wheel motor 102, the OBC/LDC 103, the front-wheel inverter 104, and the rear-wheel inverter 105, while sequentially passing through the PE part by the driving of the electric water pump 110. The coolant having a temperature raised due to the heat exchange is cooled again through the HTR 107, and then circulates through the PE part.

Furthermore, in the second cooling circuit 200, the coolant performs a heat exchange for cooling the battery 203 while passing through the battery 203 by the driving of at least any one of the electric water pump 204 and the electric water pump 211. The coolant having a temperature raised due to the heat exchange is cooled again through the LTR 206, and then circulates to the battery 203.

Separation Cooling Mode

Figure 4:
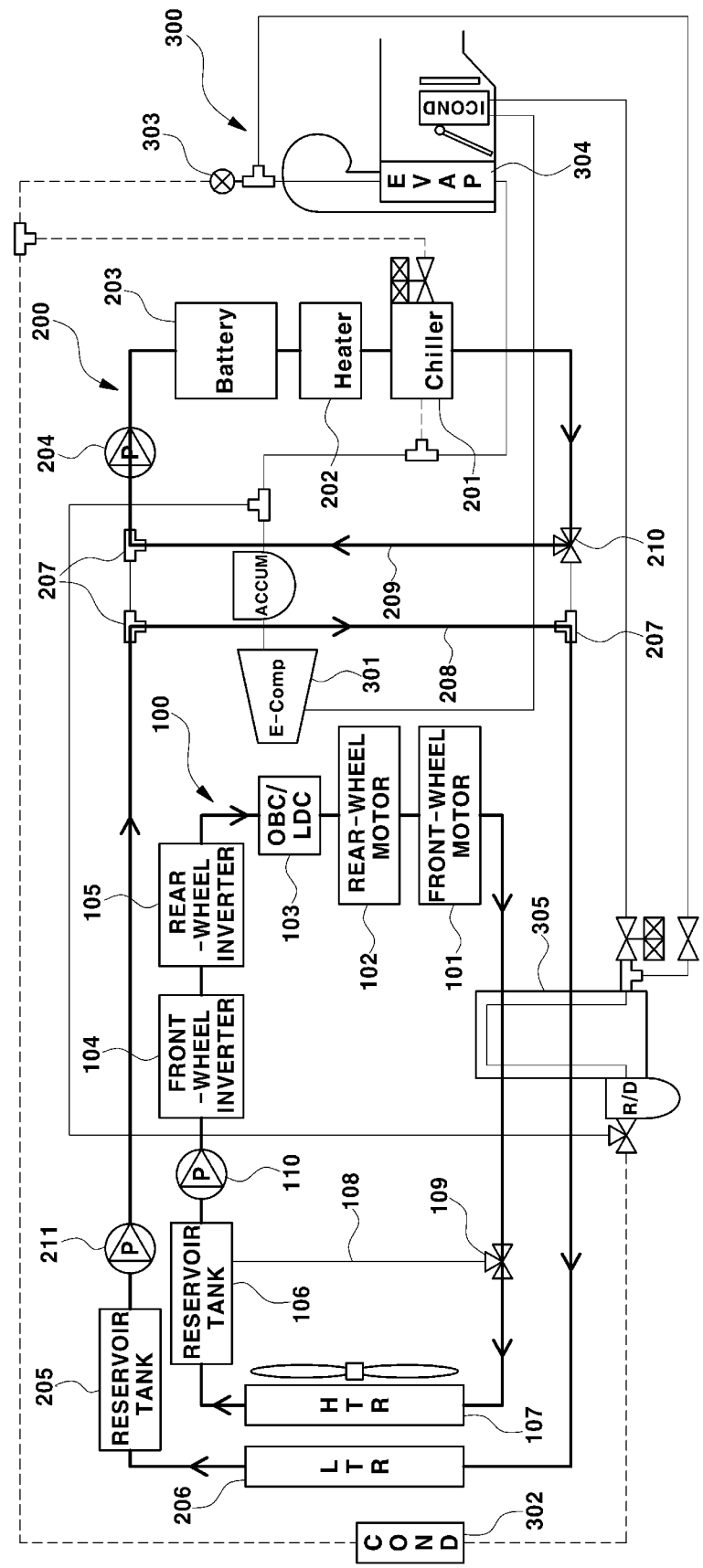
FIG. 4 is a circuit diagram illustrating a flow of a coolant when the cooling system is in a separation cooling mode.

FIG. 4 illustrates a flow state of the coolant when the cooling system for an electric vehicle is in the separation cooling mode.

The separation cooling mode refers to a mode in which the first cooling circuit 100 cools the PE part, including the front-wheel motor 101, the rear-wheel motor 102, the OBC/LDC 103, the front-wheel inverter 104, and the rear-wheel inverter 105, using the HTR 107 as in the integrated cooling mode, whereas the second cooling circuit 200 cools the battery 203 using the chiller 201 for cooling the coolant through a heat exchange with the refrigerant of the air-conditioning circuit 300 without using the LTR 206.

In the separation cooling mode, the cooling system becomes a state in which the HTR 107 is integrated so that the coolant flows toward the HTR 107, as may be seen from FIG. 4, because a cooling action of the HTR 107 among the components of the first cooling circuit 100 is desired. In contrast, the cooling system becomes a state in which the LTR 206 is separated so that the coolant does not flow toward the LTR 206, as may be seen from FIG. 4, because a cooling action of the LTR 206 among the components of the second cooling circuit 200 is unnecessary.

To this end, the first 3-way valve 109 is opened toward the HTR 107 and simultaneously shut against the first bypass line 108. The second 3-way valve 210 is shut against the LTR 206 and simultaneously opened toward the third bypass line 209.

Accordingly, in the first cooling circuit 100, the coolant performs a heat exchange for cooling the PE part, including the front-wheel motor 101, the rear-wheel motor 102, the OBC/LDC 103, the front-wheel inverter 104, and the rear-wheel inverter 105, while sequentially passing through the PE part by the driving of the electric water pump 110. The coolant having a temperature raised due to the heat exchange is cooled again through the HTR 107, and then circulates through the PE part.

In contrast, in the second cooling circuit 200, the coolant cooled by a cooling action of the chiller 201 cools the battery while performing a circulation flow in which the coolant passes through the second 3-way valve 210 and the battery 203 via the third bypass line 209.

However, in such a configuration of the cooling system for an electric vehicle, the first cooling circuit 100 for cooling the PE part and the second cooling circuit 200 for cooling the battery desire many parts, such as the two or more 3-way valves 109 and 210, the two or more bypass lines 108, 208, and 209, and the three or more T tubes 207, in order for each of the first and second cooling circuits to perform the heat pump mode, the battery temperature-rising mode, the integrated cooling mode, and the separation cooling mode. Accordingly, there are problems in that a prime cost and weight are increased and package complexity is increased. Furthermore, there is a problem in that a coolant does not flow in its designated flow direction in the T tube, etc. that connects the coolant lines, but flows into another place.

Accordingly, one form of the present disclosure provides a double 6-way valve, which can replace the two 3-way valves, the T tubes, and the bypass lines used for flow control of a coolant in the existing cooling system.

The double 6-way valve is applied to the aforementioned cooling system, and is configured to control a flow of a coolant for cooling a target part of a vehicle to be cooled and also to solve the problems.

FIGS. 5 to 8 illustrate a double 6-way valve according to some forms of the present disclosure.

As illustrated in FIG. 5 to FIG. 8, the double 6-way valve is configured to include an upper housing 10, a lower housing 20, an upper hub 30, a lower hub 40, a driving apparatus 50, etc.

The upper housing 10 may be formed in a cylindrical shape having a top closed and a bottom opened. A plurality of upper nipples 11, 12, 13, 14, 15, and 16 may be provided on an outer circumference surface of the upper housing 10. Specifically, first to sixth upper nipples 11, 12, 13, 14, 15, and 16 may be provided on the outer circumference surface of the upper housing 10.

The plurality of upper nipples 11, 12, 13, 14, 15, and 16 may be formed on the outer circumference surface of the upper housing 10 in a way to radially protrude. In this case, the plurality of upper nipples 11, 12, 13, 14, 15, and 16 may be disposed at equal intervals in the circumference direction of the upper housing 10.

Each of the upper nipples 11, 12, 13, 14, 15, and 16 may be formed in the form of a pipe through which a coolant can flow, and may be coupled to and supported by a coolant line of the cooling system. In this case, the upper nipples 11, 12, 13, 14, 15, and 16 may be coupled to the coolant lines at different locations within the cooling system.

Specifically, the first upper nipple 11 may be coupled to an entrance-side coolant line ① of the first radiator 107 among the components of the cooling system. The second upper nipple 12 may be coupled to an exit-side coolant line ② of the first radiator 107 among the components of the cooling system. The third upper nipple 13 may be coupled to an entrance-side coolant line ③ of a PE part 212 among the components of the cooling system. The fourth upper nipple 14 may be coupled to an exit-side coolant line ④ of the PE part 212 among the components of the cooling system. Furthermore, the fifth upper nipple 15 may be coupled to a first entrance-side coolant line ⑤ of the water cooling type heat exchanger 305 among the components of the cooling system. The sixth upper nipple 16 may be coupled to a first exit-side coolant line ⑥ of the water cooling type heat exchanger 305 among the components of the cooling system. The first entrance-side coolant line ⑤ and first exit-side coolant line ⑥ of the water cooling type heat exchanger 305 are coolant lines coupled to the first radiator 107.

The lower housing 20 may be formed in a cylindrical shape having a top opened and a bottom closed. The lower housing 20 may be stacked under the upper housing 10 and disposed coaxially with the upper housing 10.

A plurality of lower nipples 21, 22, 23, 24, 25, and 26 is provided on an outer circumference surface of the lower housing 20. Specifically, first to sixth lower nipples 21, 22, 23, 24, 25, and 26 may be provided on the outer circumference surface of the lower housing 20.

The plurality of lower nipples 21, 22, 23, 24, 25, and 26 may be formed on the outer circumference surface of the lower housing 20 in a way to radially protrude. In this case, the plurality of lower nipples 21, 22, 23, 24, 25, and 26 may be disposed at equal intervals in the circumference direction of the lower housing 20.

Each of the lower nipples 21, 22, 23, 24, 25, and 26 may be formed in the form of a pipe through which a coolant can flow, and may be coupled to and supported by a coolant line of the cooling system. In this case, the lower nipples 21, 22, 23, 24, 25, and 26 may be coupled to the coolant lines at different locations within the cooling system.

Specifically, the first lower nipple 21 may be coupled to an entrance-side coolant line ⑦ of the second radiator 206 among the components of the cooling system. The second lower nipple 22 may be coupled to an exit-side coolant line ⑧ of the second radiator 206 among the components of the cooling system. The third lower nipple 23 may be coupled to an entrance-side coolant line ⑨ of a battery part 213 among the components of the cooling system. The fourth lower nipple 24 may be coupled to an exit-side coolant line ⑩ of the battery part 213 among the components of the cooling system. Furthermore, the fifth lower nipple 25 may be coupled to a second entrance-side coolant line ⑪ of the water cooling type heat exchanger 305 among the components of the cooling system. The sixth lower nipple 26 may be coupled to a second exit-side coolant line ⑫ of the water cooling type heat exchanger 305 among the components of the cooling system. The second entrance-side coolant line ⑪ and second exit-side coolant line ⑫ of the water cooling type heat exchanger 305 are coolant lines coupled to the second radiator 206.

In this case, the battery part 213 refers to a battery 203, a coolant heater 202, and a chiller 201 among the components of the cooling system.

The upper hub 30 may be rotatably mounted within the upper housing 10. In this case, an outer circumference surface of the upper hub 30 comes into contact with an inner circumference surface of the upper housing 10. Specifically, the upper hub 30 may be formed in a cylindrical shape rotatable within the upper housing 10.

A plurality of upper flow channels 31, 32, and 33 is independently provided within the upper hub 30. Specifically, three upper flow channels 31, 32, and 33 may be provided within the upper hub 30. More specifically, a first upper flow channel 31, a second upper flow channel 32, and a third upper flow channel 33 may be provided within the upper hub 30.

Each of the upper flow channels 31, 32, and 33 has a first end and a second end for the entrance and exit of a coolant. The first end and the second end are disposed on the outer circumference surface of the upper hub 30. For example, coolants introduced into the upper flow channels 31, 32, and 33 through the first ends of the upper flow channels 31, 32, and 33 penetrate through the upper hub 30 via the upper flow channels 31, 32, and 33, and are discharged through the upper flow channels 31, 32, and 33 via the second ends of the upper flow channels 31, 32, and 33.

More specifically, each of the upper flow channels 31, 32, and 33 is provided in the upper hub 30, and enables the coolant to flow within the upper hub 30. In this case, the first end and second end of each of the upper flow channels 31, 32, and 33 are disposed on the outer circumference surface of the upper hub 30 at a given interval in the circumference direction of the upper hub 30.

Each of the upper flow channels 31, 32, and 33 is coupled to two upper nipples, selected among the plurality of upper nipples 11, 12, 13, 14, 15, and 16, in a way that the coolant flows into each flow channel. A location where each of the upper flow channels 31, 32, and 33 is placed within the upper housing 10 is different depending on a rotation angle of the upper hub 30. Accordingly, each of the upper flow channels 31, 32, and 33 is coupled to two upper nipples selected depending on a rotation angle of the upper hub 30, among the plurality of upper nipples 11, 12, 13, 14, 15, and 16.

In this case, each of the upper flow channels 31, 32, and 33 may enable the two upper nipples, selected depending on the rotation angle of the upper hub 30, to communicate with each other so that the coolant can flow through the two upper nipples.

Specifically, when a rotation angle of the upper hub 30 is 0°, the first upper flow channel 31 may be coupled to the second upper nipple 12 and the third upper nipple 13 in a way that the coolant can flow through the second upper nipple 12 and the third upper nipple 13, the second upper flow channel 32 may be coupled to the fourth upper nipple 14 and the fifth upper nipple 15 in a way that the coolant can flow through the fourth upper nipple 14 and the fifth upper nipple 15, and the third upper flow channel 33 may be coupled to the first upper nipple 11 and the sixth upper nipple 16 in a way that the coolant can flow through the first upper nipple 11 and the sixth upper nipple 16.

Figure 7:
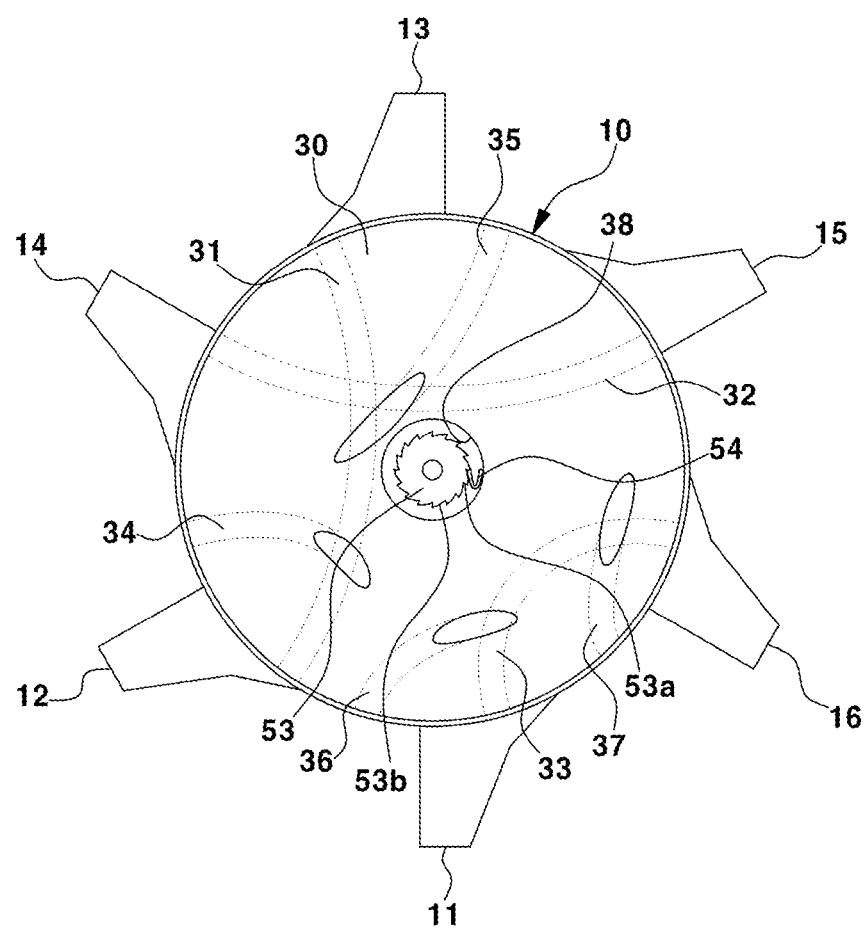
FIG. 7 is a diagram viewed from A-A in FIG. 5.
Figure 10:
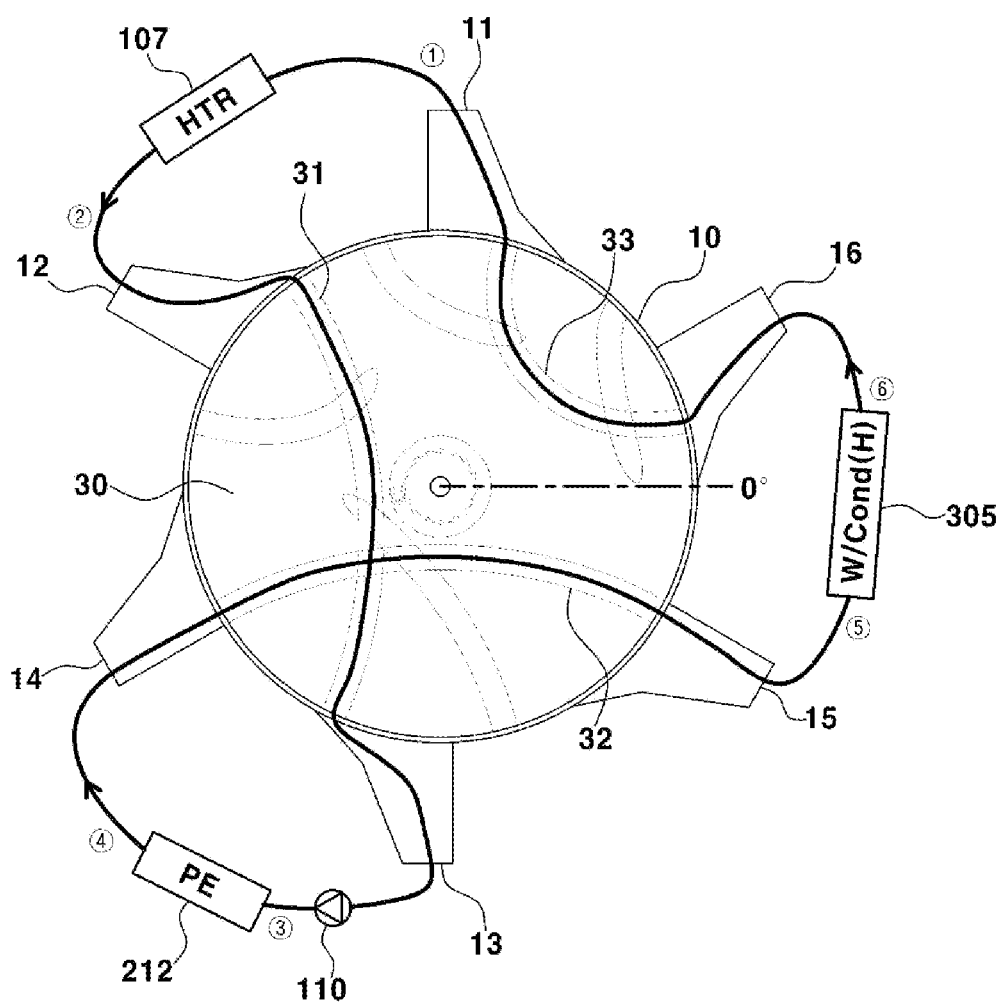
FIGS. 10 to 12 are diagrams respectively illustrating a flow of a coolant according to a rotation angle of an upper hub among the components of the double 6-way valve according to an exemplary form of the present disclosure.

In this case, as illustrated in FIGS. 7 and 10, the first end of the first upper flow channel 31 may be coupled to the second upper nipple 12, and the second end of the first upper flow channel 31 may be coupled to the third upper nipple 13. The first end of the second upper flow channel 32 may be coupled to the fourth upper nipple 14, and the second end of the second upper flow channel 32 may be coupled to the fifth upper nipple 15. The first end of the third upper flow channel 33 may be coupled to the sixth upper nipple 16, and the second end of the third upper flow channel 33 may be coupled to the first upper nipple 11.

The first end and second end of each of the upper flow channels 31, 32, and 33 are disposed at a predetermined interval in the circumference direction of the upper hub 30. The first end of the first upper flow channel 31, the first end of the second upper flow channel 32, and the first end of the third upper flow channel 33 are also disposed at predetermined intervals from one another.

In this case, the case where the rotation angle of the upper hub 30 is 0° is defined as the reference state of the upper hub 30. The upper hub 30 may be rotated at a predetermined angle with respect to the reference state. For example, the upper hub 30 may be rotated by 60° in a first direction with respect to the reference state. The first direction may be counterclockwise.

The lower hub 40 may be rotatably mounted within the lower housing 20. In this case, an outer circumference surface of the lower hub 40 comes into contact with an inner circumference surface of the lower housing 20. Furthermore, at this time, the lower hub 40 is stacked under the upper hub 30 and disposed coaxially with the upper hub 30. The lower hub 40 may be formed in a cylindrical shape rotatable within the lower housing 20.

A plurality of lower flow channels 41, 42, and 43 is independently provided within the lower hub 40. Specifically, three lower flow channels 41, 42, and 43 may be provided within the lower hub 40. That is, a first lower flow channel 41, a second lower flow channel 42, and a third lower flow channel 43 may be provided within the lower hub 40.

Each of the lower flow channels 41, 42, and 43 has a first end and second end for the entrance and exit of a coolant. The first end and the second end are disposed on the outer circumference surface of the lower hub 40 at a given interval in the circumference direction of the lower hub 40. Each of the lower flow channels 41, 42, and 43 is provided in the lower hub 40, and enables a coolant to flow within the lower hub 40.

Each of the lower flow channels 41, 42, and 43 is coupled to two lower nipples, selected among the plurality of lower nipples 21, 22, 23, 24, 25, and 26, in a way that the coolant can flow through the two lower nipples. A location where each of the lower flow channels 41, 42, and 43 is placed within the lower housing 20 is different depending on a rotation angle of the lower hub 40. Accordingly, each of the lower flow channels 41, 42, and 43 is coupled to two lower nipples selected depending on a rotation angle of the lower hub 40, among the plurality of lower nipples 21, 22, 23, 24, 25, and 26.

In this case, each of the lower flow channels 41, 42, and 43 may enable the two lower nipples, selected depending on the rotation angle of the lower hub 40, to communicate with each other so that the coolant can flow through the two lower nipples.

Specifically, when a rotation angle of the lower hub 40 is 0°, the first lower flow channel 41 may be coupled to the second lower nipple 22 and the third lower nipple 23 in a way that the coolant can flow through the second lower nipple 22 and the third lower nipple 23, the second lower flow channel 42 may be coupled to the fourth lower nipple 24 and the fifth lower nipple 25 in a way that the coolant flows through the fourth lower nipple 24 and the fifth lower nipple 25, and the third lower flow channel 43 may be coupled to the sixth lower nipple 26 and the first lower nipple 21 in a way that the coolant can flow through the sixth lower nipple 26 and the first lower nipple 21.

Figure 8:
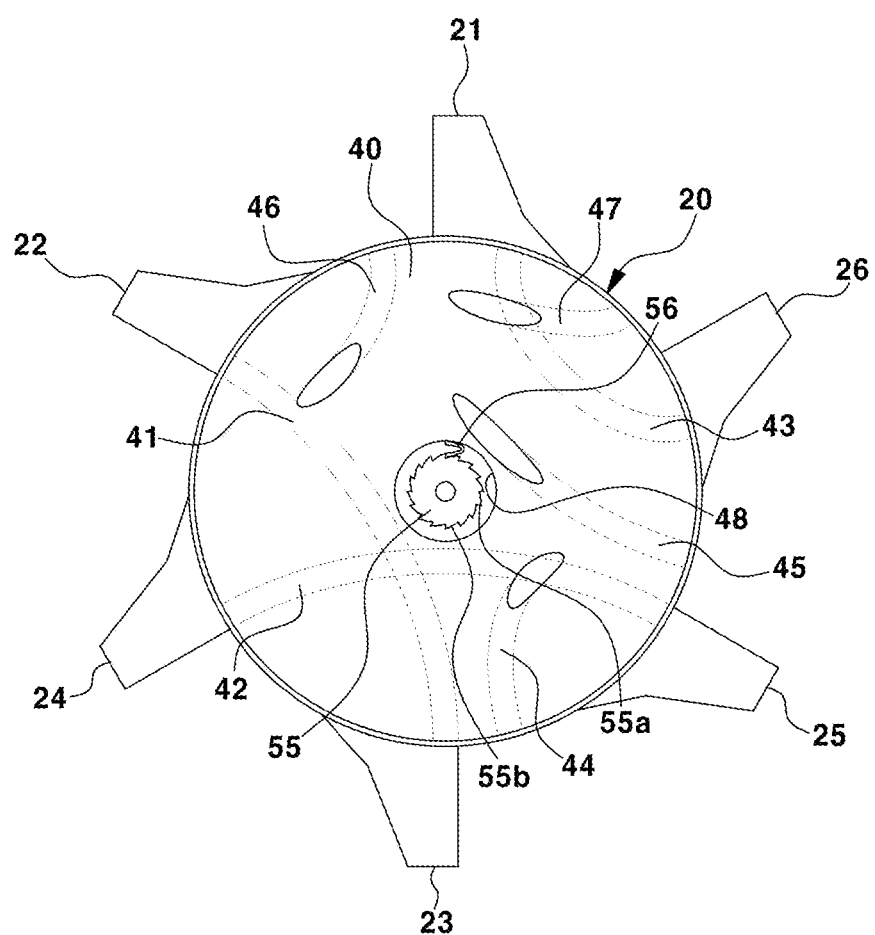
FIG. 8 is a diagram viewed from B-B in FIG. 5.
Figure 9:
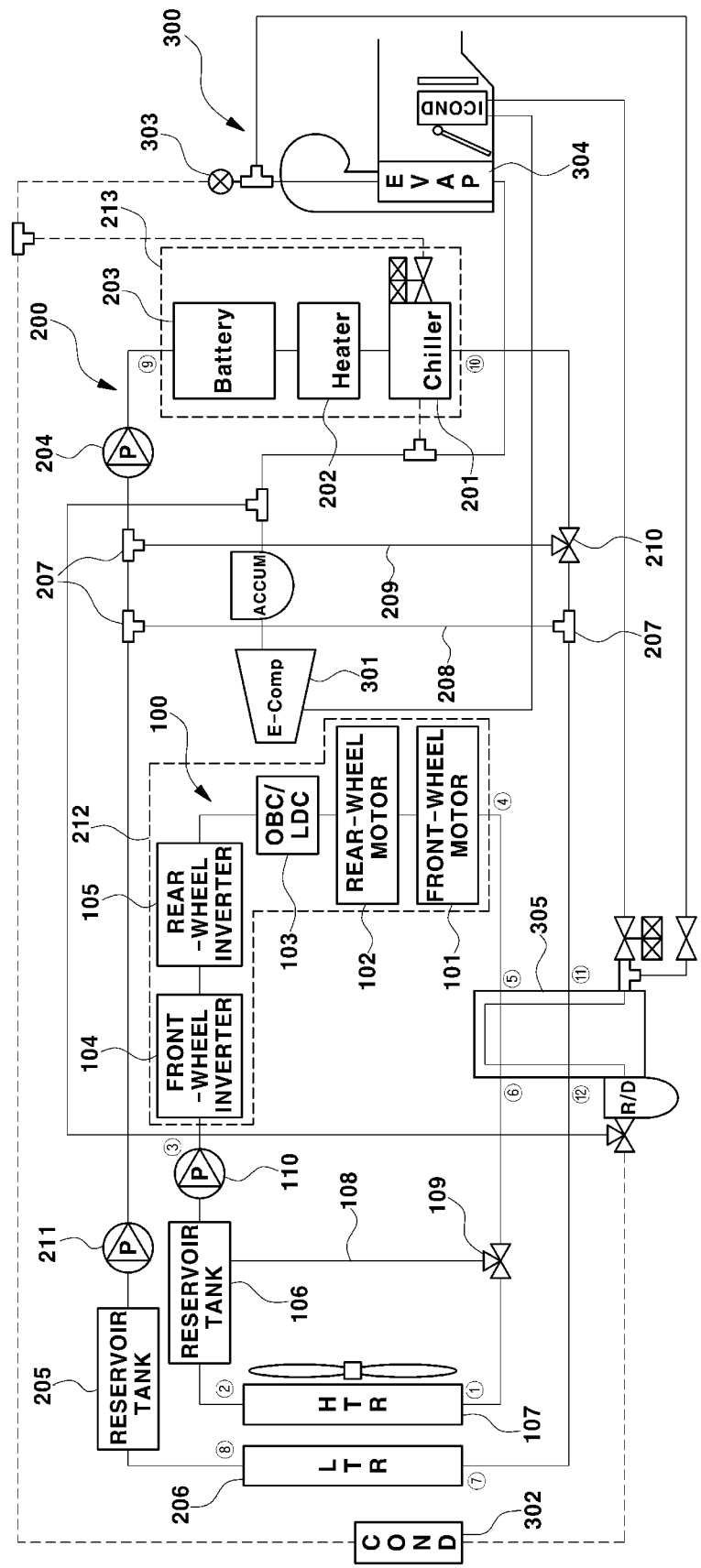
FIG. 9 is a circuit diagram illustrating that portions where upper nipples and lower nipples among the components of the double 6-way valve according to one form of the present disclosure are coupled to a cooling system for an electric vehicle are matched.

In this case, as illustrated in FIGS. 8 and 13, the first end of the first lower flow channel 41 may be coupled to the second lower nipple 22, and the second end of the first lower flow channel 41 may be coupled to the third lower nipple 23. The first end of the second lower flow channel 42 may be coupled to the second lower nipple 22, and the second end of the second lower flow channel 42 may be coupled to the fifth lower nipple 25. The first end of the third lower flow channel 43 may be coupled to the sixth lower nipple 26, and the second end of the third lower flow channel 43 may be coupled to the first lower nipple 21.

The first end and second end of each of the lower flow channels 41, 42, and 43 are disposed at a predetermined interval in the circumference direction of the lower hub 40. The first end of the first lower flow channel 41, the first end of the second lower flow channel 42, and the first end of the third lower flow channel 43 are also disposed at predetermined intervals from one another.

In this case, the case where the rotation angle of the lower hub 40 is 0° is defined as the reference state of the lower hub 40. The lower hub 40 may be rotated at a predetermined angle with respect to the reference state. For example, the lower hub 40 may be rotated by 60° in the first direction with respect to the reference state. The first direction may be counterclockwise. A direction opposite to the first direction may be a second direction. The second direction may be clockwise.

Furthermore, a plurality of upper half flow channels 34, 35, 36, and 37 may be independently provided within the upper hub 30. Specifically, four upper half flow channels 34, 35, 36, and 37 may be provided within the upper hub 30. More specifically, a first upper half flow channel 34, a second upper half flow channel 35, a third upper half flow channel 36, and a fourth upper half flow channel 37 may be provided within the upper hub 30.

Each of the first to fourth upper half flow channels 34, 35, 36, and 37 may be formed to extend from the outer circumference surface of the upper hub 30 up to the bottom of the upper hub 30. In this case, the tops of the first to fourth upper half flow channels 34, 35, 36, and 37 may be disposed on the outer circumference surface of the upper hub 30 at given intervals. The top of each of the first to fourth upper half flow channels 34, 35, 36, and 37 may be coupled to an upper nipple selected depending on a rotation angle of the upper hub 30.

Furthermore, the bottom of each of the first to fourth upper half flow channels 34, 35, 36, and 37 may come into contact with the top of the lower hub 40 stacked under the upper hub 30.

A plurality of lower half flow channels 44, 45, 46, and 47 may be independently provided within the lower hub 40. Specifically, four lower half flow channels 44, 45, 46, and 47 may be provided within the lower hub 40. More specifically, a first lower half flow channel 44, a second lower half flow channel 45, a third lower half flow channel 46, and a fourth lower half flow channel 47 may be provided within the lower hub 40.

Each of the first to fourth lower half flow channels 44, 45, 46, and 47 may be formed to extend from the outer circumference surface of the lower hub 40 up to the top of the lower hub 40. In this case, the bottoms of the first to fourth lower half flow channels 44, 45, 46, and 47 may be disposed on the outer circumference surface of the lower hub 40 at given intervals. The bottom of each of the first to fourth lower half flow channels 44, 45, 46, and 47 may be coupled to a lower nipple selected depending on a rotation angle of the lower hub 40.

Furthermore, the top of each of the first to fourth lower half flow channels 44, 45, 46, and 47 may come into contact with the top of the upper hub 30 stacked over the lower hub 40.

The bottom of the first upper half flow channel 34 and the top of the first lower half flow channel 44 may be selectively coupled based on rotation angles of the upper hub 30 and the lower hub 40.

Figure 16:
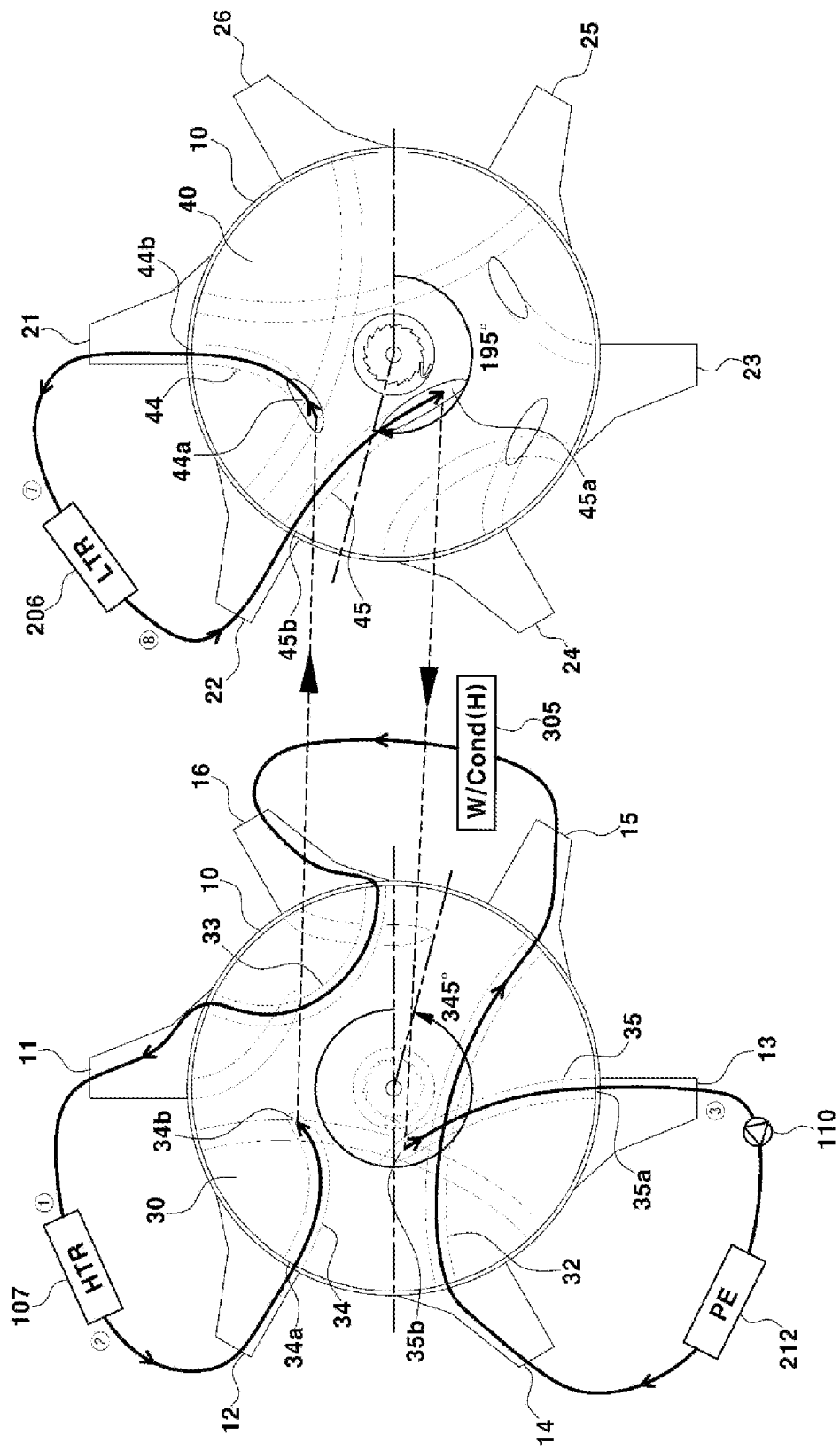

Specifically, as illustrated in FIG. 16, if the upper hub 30 is rotated at a predetermined first angle and the lower hub 40 is rotated at a predetermined second angle, the bottom of the first upper half flow channel 34 and the top of the first lower half flow channel 44 may be coupled in a way that the coolant can flow through the first upper half flow channel 34 and the first lower half flow channel 44. Furthermore, at this time, the top of the first upper half flow channel 34 is coupled to the second upper nipple 12, and the bottom of the first lower half flow channel 44 is coupled to the first lower nipple 21. For example, the first angle may be an angle at which the upper hub 30 rotates by 345° in the first direction. The second angle may be an angle at which the lower hub 40 rotates by 195° in the second direction.

When the bottom of the first upper half flow channel 34 and the top of the first lower half flow channel 44 are coupled, the bottom of the second upper half flow channel 35 and the top of the second lower half flow channel 45 are also coupled.

Figure 17:
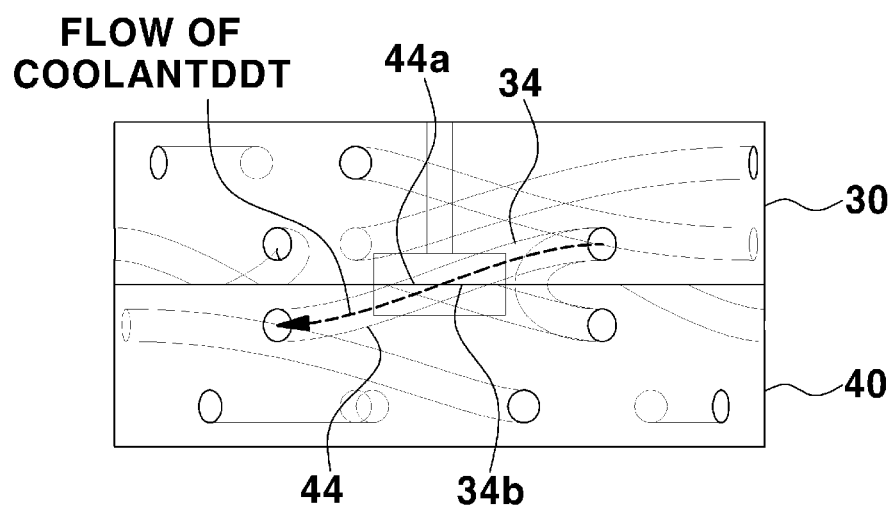
Figure 18:
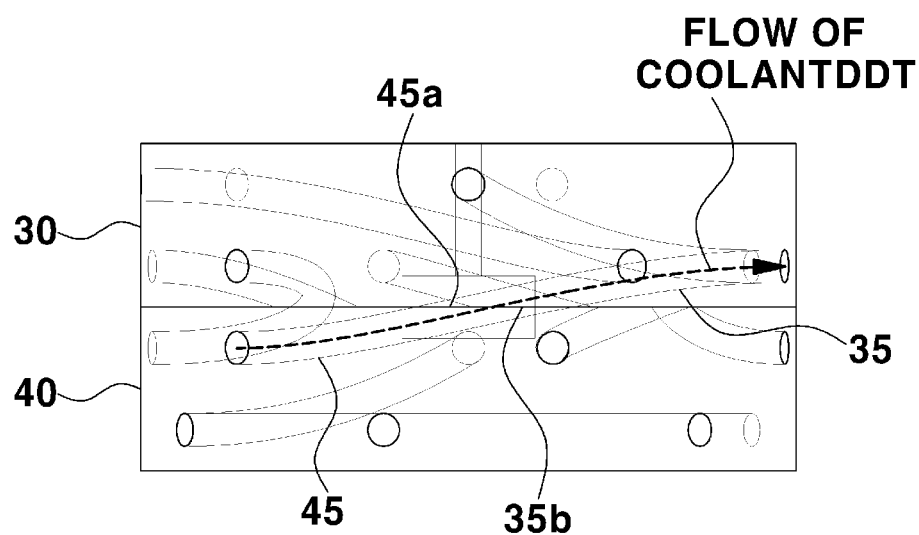

Specifically, as illustrated in FIGS. 16 to 18, if the upper hub 30 is rotated at the first angle and the lower hub 40 is rotated at the second angle, the bottom of the second upper half flow channel 35 and the top of the second lower half flow channel 45 are coupled in a way that the coolant can flow through the second upper half flow channel 35 and the second lower half flow channel 45. The top of the second upper half flow channel 35 is coupled to the third upper nipple 13, and the bottom of the second lower half flow channel 45 is coupled to the second lower nipple 22.

Furthermore, the bottom of the third upper half flow channel 36 and the top of the third lower half flow channel 46 may be selectively coupled depending on rotation angles of the upper hub 30 and the lower hub 40.

Figure 19:
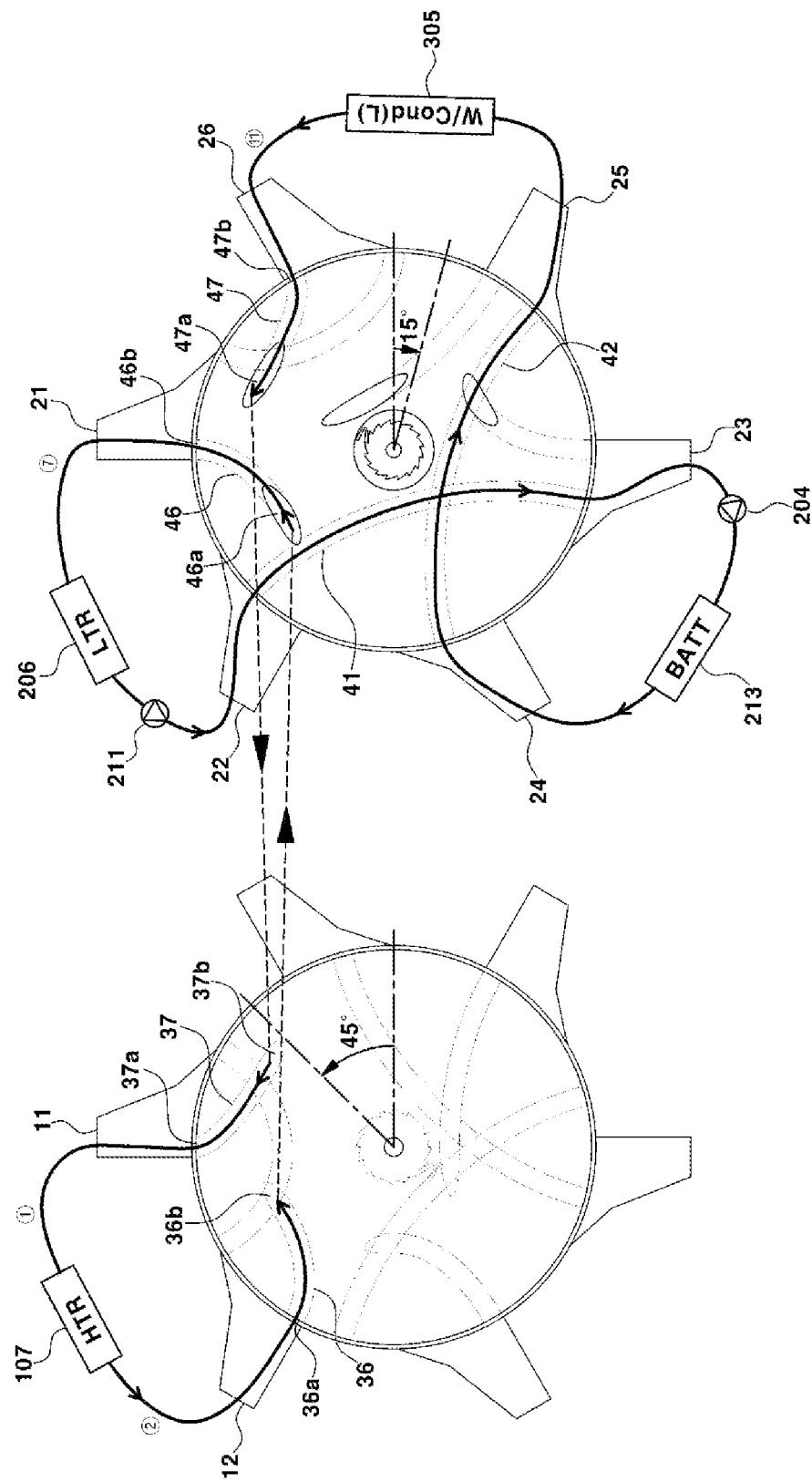

Specifically, as illustrated in FIG. 19, if the upper hub 30 is rotated at a predetermined third angle and the lower hub 40 is rotated at a predetermined fourth angle, the bottom of the third upper half flow channel 36 and the top of the third lower half flow channel 46 may be coupled in a way that the coolant can flow through the third upper half flow channel 36 and the third lower half flow channel 46. Furthermore, at this time, the top of the third upper half flow channel 36 is coupled to the second upper nipple 12, and the bottom of the third lower half flow channel 46 is coupled to the first lower nipple 21. For example, the third angle may be an angle at which the upper hub 30 rotates by 45° in the first direction. The fourth angle may be an angle at which the lower hub 40 rotates by 15° in the second direction.

When the bottom of the third upper half flow channel 36 and the top of the third lower half flow channel 46 are coupled, the bottom of the fourth upper half flow channel 37 and the top of the fourth lower half flow channel 47 are also coupled.

Figure 20:
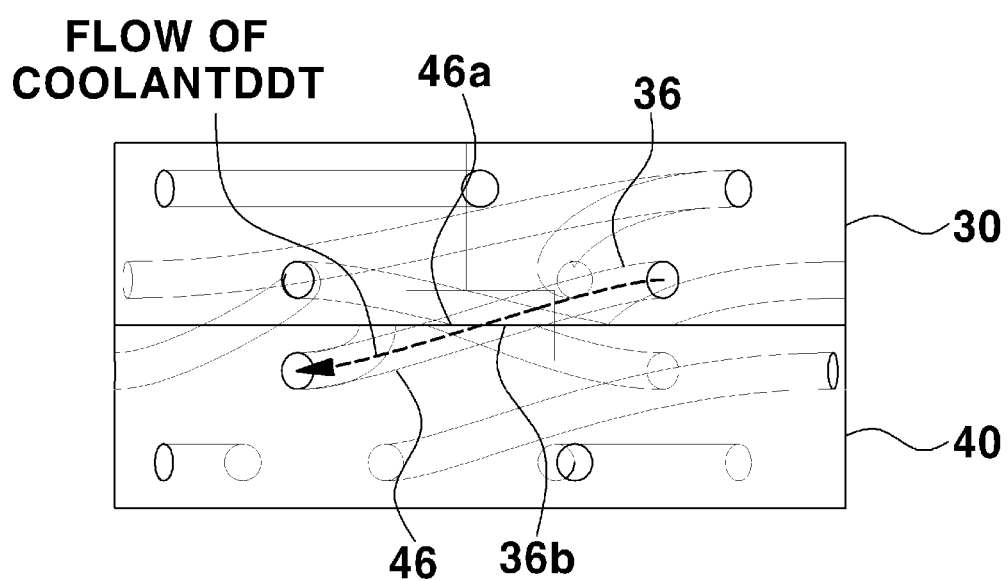
Figure 21:
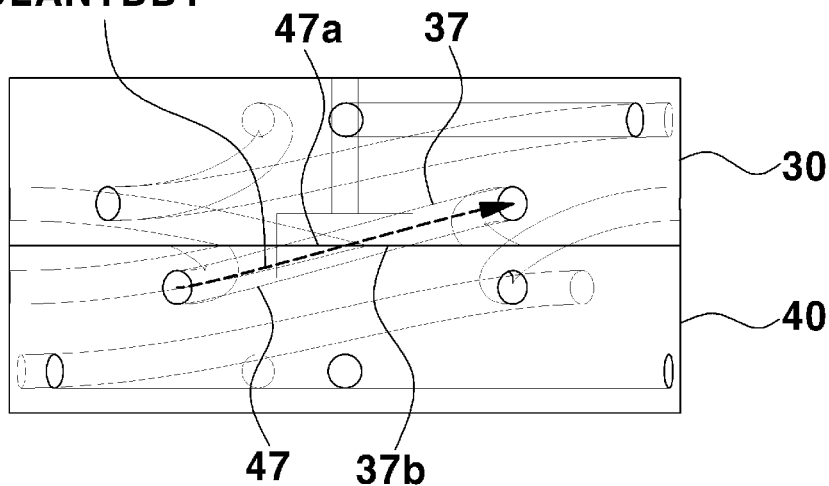

Specifically, as illustrated in FIGS. 19 to 21, if the upper hub 30 is rotated at the third angle and the lower hub 40 is rotated at the fourth angle, the bottom of the fourth upper half flow channel 37 and the top of the fourth lower half flow channel 47 are coupled in a way that the coolant can flow through the fourth upper half flow channel 37 and the fourth lower half flow channel 47. The top of the fourth upper half flow channel 37 is coupled to the first upper nipple 11, and the bottom of the fourth lower half flow channel 47 is coupled to the fifth lower nipple 25.

Figure 5:
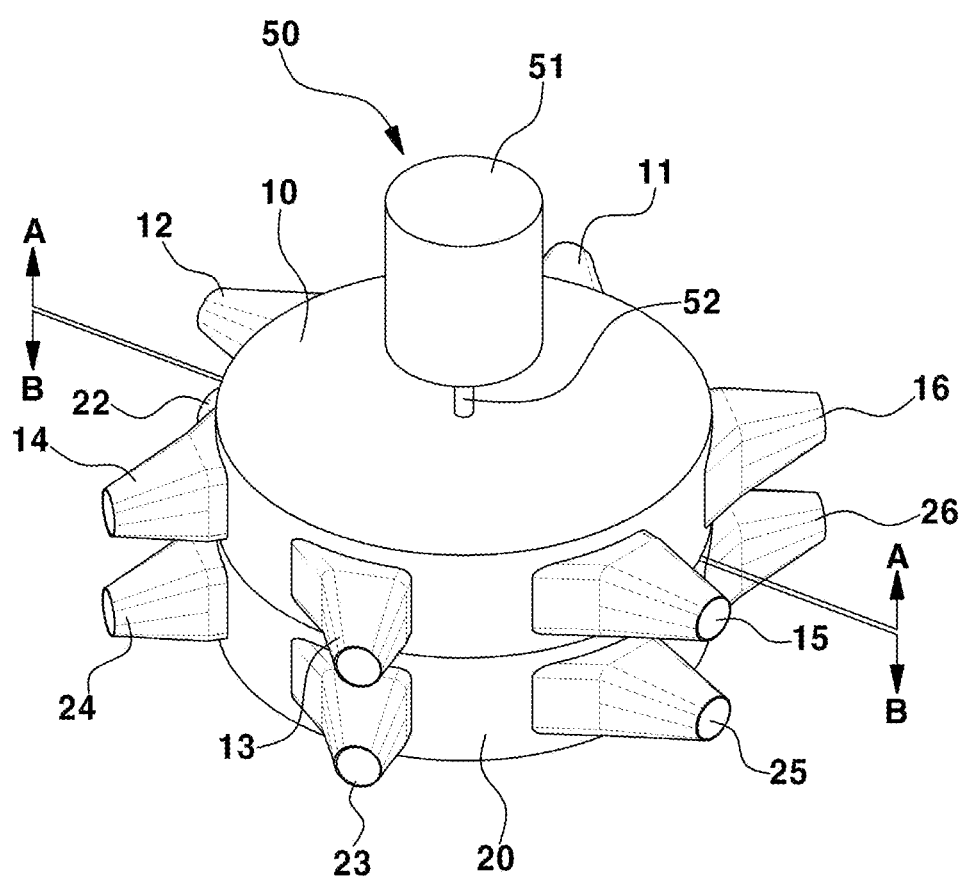
FIG. 5 is a coupling perspective view illustrating a double 6-way valve for a vehicle cooling system according to one form of the present disclosure.
Figure 6:
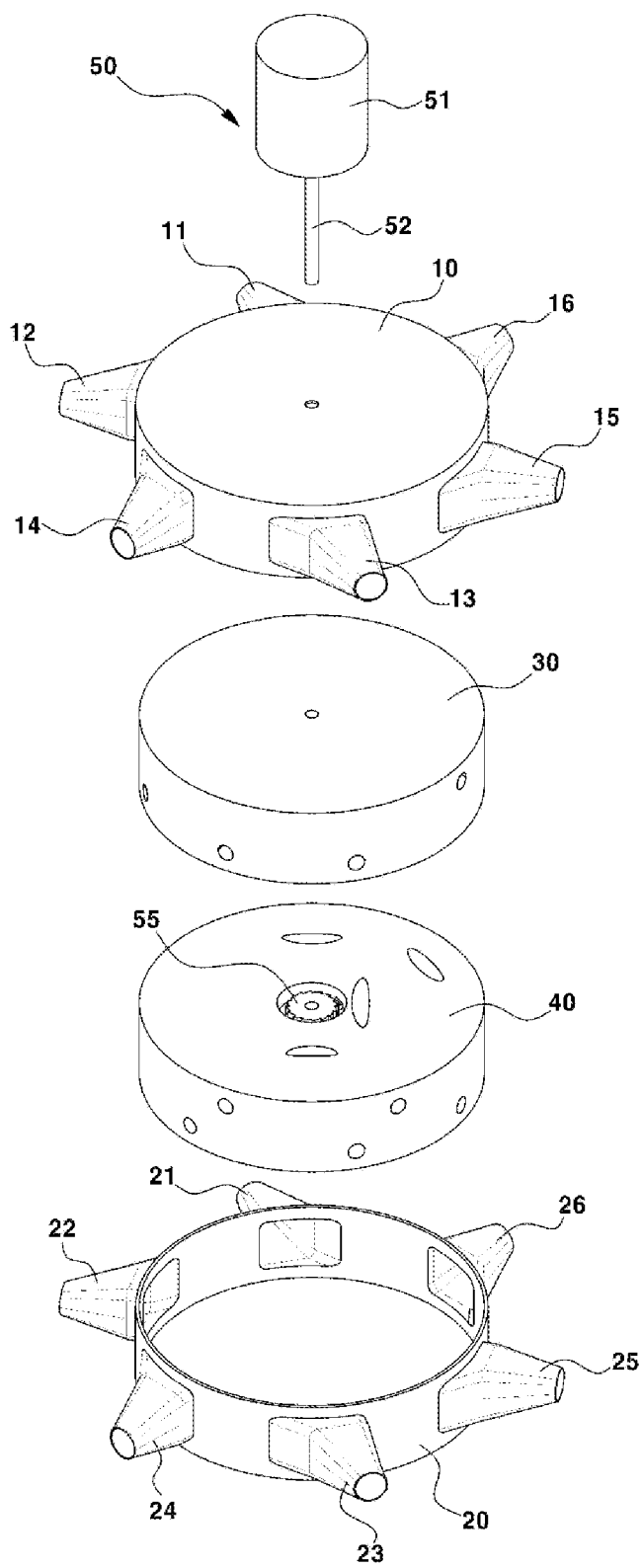
FIG. 6 is an exploded perspective view illustrating a double 6-way valve for a vehicle cooling system according to an exemplary form of the present disclosure.

As illustrated in FIGS. 5 and 6, the driving apparatus 50 is coupled to the center of rotation of the upper hub 30 and the lower hub 40. The driving apparatus 50 is configured to rotate the upper hub 30 and the lower hub 40.

The driving apparatus 50 is configured to selectively rotate one of the upper hub 30 and the lower hub 40 using one motor 51. To this end, the driving apparatus 50 is configured to rotate the upper hub 30 in the first direction using the motor 51 or to rotate the lower hub 40 in the second direction using the motor 51. The motor 51 may be a step motor capable of forward rotation and backward rotation.

Referring to FIGS. 5 to 8, the motor 51 is mounted on the top of the upper housing 10. A shaft 52 of the motor 51 is disposed to penetrate the upper center hole 38 of the upper hub 30 disposed within the upper housing 10 and to penetrate the lower center hole 48 of the lower hub 40 disposed within the lower housing 20.

In this case, the shaft 52 of the motor 51 is disposed at a given distance from the upper center hole 38 and the lower center hole 48 in a radial direction. Accordingly, although the shaft 52 is rotated, the turning force of the motor 51 is not directly delivered to the upper hub 30 and the lower hub 40.

In order to selectively deliver, to the upper hub 30 or the lower hub 40, a turning force when the shaft 52 of the motor 51 is rotated, the driving apparatus 50 may be configured to include a first ratchet 53, a first spring clip 54, a second ratchet 55, and a second spring clip 56.

The first ratchet 53 has a structure in which a first latch jaw 53a and a first inclined plane 53b are repeatedly formed on an outer circumference surface thereof in the circumference direction. The first ratchet 53 is disposed adjacent to the inner circumference surface of the upper hub 30 and is rotatably coupled to the shaft 52 of the motor 51. In this case, the inner circumference surface of the upper hub 30 surrounds the upper center hole 38.

The first spring clip 54 is formed in a U shape which may be compressed and deformed. One end (i.e., a first end) of the first spring clip 54 is mounted on the inner circumference surface of the upper hub 30, and the other end (i.e., a second end) thereof is a free end which may be compressed and deformed. The other end of the first spring clip 54 is latched onto the first latch jaw 53a of the first ratchet 53 and seated in the first inclined plane 53b.

The second ratchet 55 has a structure in which a second latch jaw 55a and a second inclined plane 55b are repeatedly formed on an outer circumference surface thereof in the circumference direction. The second ratchet 55 is disposed adjacent to the inner circumference surface of the lower hub 40 and also rotatably coupled to the shaft 52 of the motor 51. In this case, the inner circumference surface of the lower hub 40 surrounds the lower center hole 48.

The second spring clip 56 is formed in a U shape which may be compressed and deformed. One end (i.e., a first end) of the second spring clip 56 is mounted on the inner circumference surface of the lower hub 40, and the other end (i.e., a second end) thereof is a free end which may be compressed and deformed. The other end of the second spring clip 56 is latched onto the second latch jaw 55a of the second ratchet 55 and seated in the second inclined plane 55b.

In this case, when the motor 51 is rotated in the first direction, the first spring clip 54 is latched onto the first latch jaw 53a. When the motor 51 is rotated in the second direction, the second spring clip 56 is latched onto the second latch jaw 55a. The first direction and the second direction are opposite directions.

Accordingly, when the shaft 52 is rotated in the first direction and simultaneously the first ratchet 53 is rotated in the first direction by the driving of the motor 51, the second end of the first spring clip 54 is latched onto the first latch jaw 53a of the first ratchet 53, and the first ratchet 53 pushes the first spring clip 54 and rotates. Accordingly, the upper hub 30 coupled to the first end of the first spring clip 54 is also rotated in the first direction.

In one form, when the shaft 52 is rotated in the first direction and simultaneously the second ratchet 55 is rotated in the first direction by the driving of the motor 51, the second end of the second spring clip 56 repeatedly performs an operation of climbing over the second inclined plane 55b of the second ratchet 55. Accordingly, the lower hub 40 maintains a stopped state because the turning force of the motor 51 is not delivered to the lower hub 40.

In another form, when the shaft 52 is rotated in the second direction and simultaneously the first ratchet 53 is rotated in the second direction by the driving of the motor 51, the second end of the first spring clip 54 repeatedly performs an operation of climbing over the first inclined plane 53b of the first ratchet 53. Accordingly, the upper hub 30 maintains a stopped state because the turning force of the motor 51 is not delivered to the upper hub 30.

Furthermore, when the shaft 52 is rotated in the second direction and simultaneously the second ratchet 55 is rotated in the second direction, the second end of the second spring clip 56 is latched onto the second latch jaw 55a of the second ratchet 55, and the second ratchet 55 pushes the second spring clip 56 and rotates. Accordingly, the lower hub 40 coupled to the first end of the second spring clip 56 is also rotated in the second direction.

As described above, the driving apparatus 50 can rotate only the upper hub 30 at a given angle in the first direction or rotate only the lower hub 40 at a given angle in the second direction, using only the one motor 51.

Figure 11:
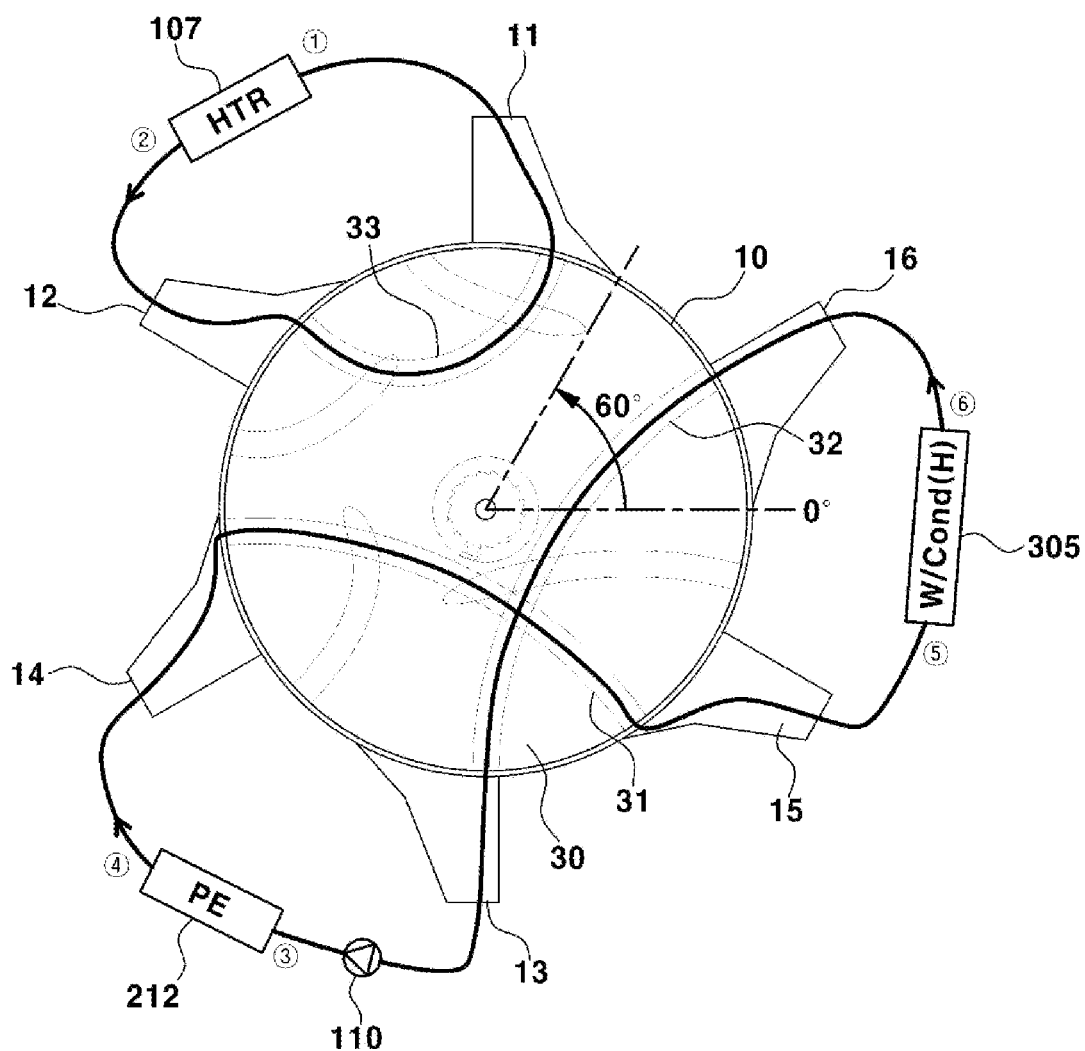
Figure 12:
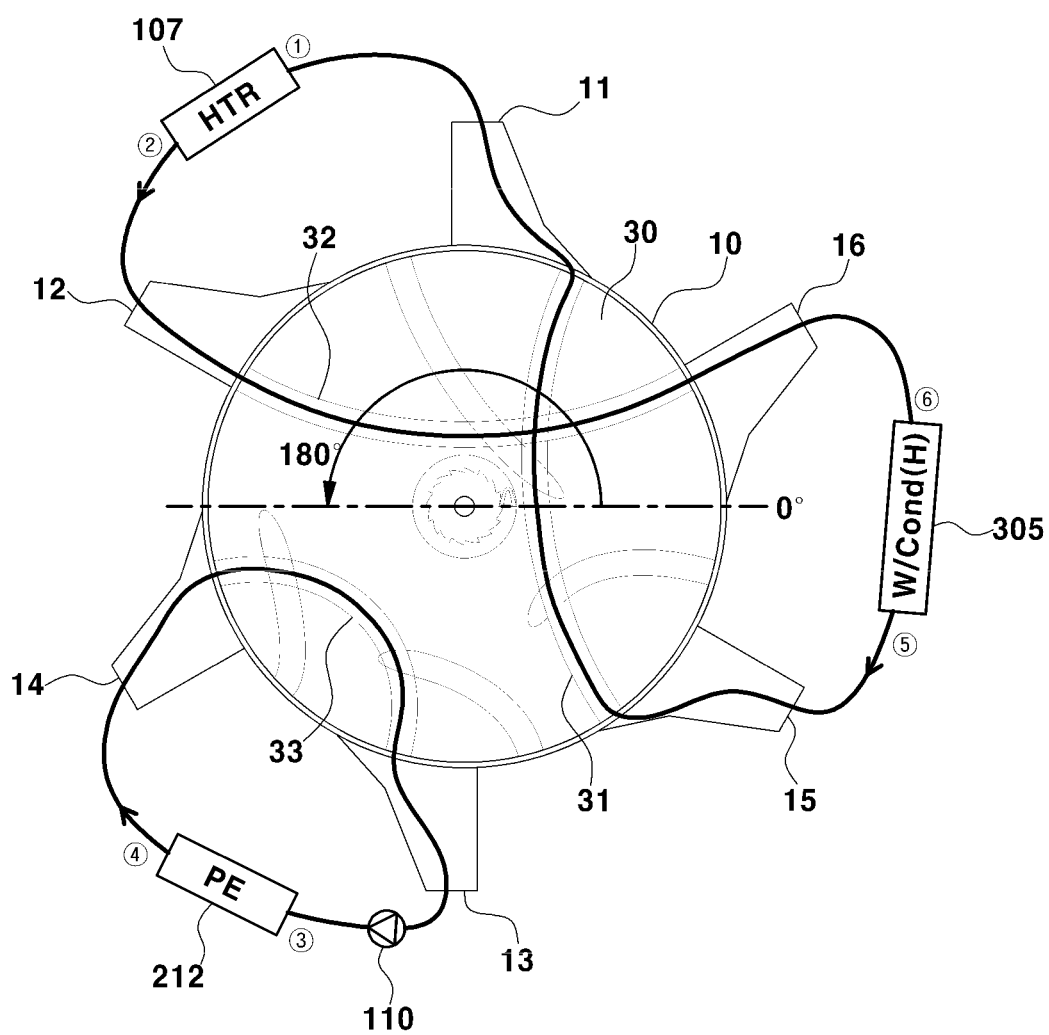

FIGS. 10 to 21 are diagrams illustrating a flow state of a coolant in the cooling system according to an operating state of the double 6-way valve. Specifically, FIGS. 10 to 12 are diagrams illustrating a flow of a coolant according to a rotation angle of the upper hub among the components of the double 6-way valve according to some forms of the present disclosure. FIGS. 13 to 15 are diagrams illustrating a flow of a coolant according to a rotation angle of the lower hub among the components of the double 6-way valve according to another form of the present disclosure. FIGS. 16 to 21 are diagrams illustrating an operating state of the upper hub and the lower hub for the matching of the upper half flow channel and the lower half flow channel among the components of the double 6-way valve according to some forms of the present disclosure and a state in which a flow of a coolant according to the operating state is controlled.

As illustrated in FIG. 10, when a rotation angle of the upper hub 30 is 0°, that is, when an operating state of the upper hub 30 is the reference state, the first upper flow channel 31 becomes a state in which it is coupled to the second upper nipple 12 and the third upper nipple 13 in a way that the coolant can flow through the first upper flow channel 31. The second upper flow channel 32 becomes a state in which it is coupled to the fourth upper nipple 14 and the fifth upper nipple 15 in a way that the coolant can flow through the second upper flow channel 32. The third upper flow channel 33 becomes a state in which it is coupled to the first upper nipple 11 and the sixth upper nipple 16 in a way that the coolant can flow through the third upper flow channel 33.

Accordingly, the exit-side coolant line ② of the first radiator 107 coupled to the second upper nipple 12 and the entrance-side coolant line ③ of the PE part 212 coupled to the third upper nipple 13 communicate with each other through the first upper flow channel 31 in a way that the coolant can flow through the first upper flow channel 31. The exit-side coolant line ④ of the PE part 212 coupled to the fourth upper nipple 14 and the first entrance-side coolant line ⑤ of the water cooling type heat exchanger 305 coupled to the fifth upper nipple 15 communicate with each other through the second upper flow channel 32 in a way that the coolant can flow through the second upper flow channel 32. The entrance-side coolant line ① of the first radiator 107 coupled to the first upper nipple 11 and the first exit-side coolant line ⑥ of the water cooling type heat exchanger 305 coupled to the sixth upper nipple 16 communicate with each other through the third upper flow channel 33 in a way that the coolant can flow through the third upper flow channel 33.

Accordingly, the PE part 212 is coupled to the first radiator 107 and the water cooling type heat exchanger 305 in a way that the coolant can flow through the first radiator 107 and the water cooling type heat exchanger 305. The PE part 212 becomes a state in which it may be cooled by a coolant cooled through the first radiator 107.

Accordingly, if the upper hub 30 maintains the reference state, the integrated cooling mode can be performed on the PE part 212 of the existing cooling system (i.e., a cooling system to which the double 6-way valve of the present disclosure has not been applied).

As illustrated in FIG. 11, when the upper hub 30 is rotated by 60° in the first direction with respect to the reference state, the first upper flow channel 31 becomes a state in which it is coupled to the fourth upper nipple 14 and the fifth upper nipple 15 in a way that the coolant can flow through the first upper flow channel 31. The second upper flow channel 32 becomes a state in which it is coupled to the third upper nipple 13 and the sixth upper nipple 16 in a way that the coolant can flow through the second upper flow channel 32. The third upper flow channel 33 becomes a state in which it is coupled to the first upper nipple 11 and the second upper nipple 12 in a way that the coolant can flow through the third upper flow channel 33.

Accordingly, the exit-side coolant line ④ of the PE part 212 coupled to the fourth upper nipple 14 and the first entrance-side coolant line ⑤ of the water cooling type heat exchanger 305 coupled to the fifth upper nipple 15 communicate with each other through the first upper flow channel 31 in a way that the coolant can flow through the first upper flow channel 31. The entrance-side coolant line ③ of the PE part 212 coupled to the third upper nipple 13 and the first exit-side coolant line ⑥ of the water cooling type heat exchanger 305 coupled to the sixth upper nipple 16 communicate with each other through the second upper flow channel 32 in a way that the coolant can flow through the second upper flow channel 32. The entrance-side coolant line ① of the first radiator 107 coupled to the first upper nipple 11 and the exit-side coolant line ② of the first radiator 107 coupled to the second upper nipple 12 communicate with each other through the third upper flow channel 33 in a way that the coolant can flow through the third upper flow channel 33.

Furthermore, accordingly, the PE part 212 becomes a state in which it is separated from the first radiator 107 and coupled to the water cooling type heat exchanger 305. The PE part 212 becomes a state in which cooling through the first radiator 107 is impossible.

In this case, the water cooling type heat exchanger 305 may recover waste heat from the PE part 212 or warm up the PE part 212, depending on its operating mode.

Specifically, when the air-conditioning circuit 300 operates in the battery temperature-rising mode, if the water cooling type heat exchanger 305 functions as an evaporator, a low-temperature and low-pressure refrigerant supplied by the air-conditioning circuit 300 absorbs heat from the coolant while passing through the water cooling type heat exchanger 305. At this time, the coolant having a temperature lowered by the refrigerant may recover waste heat from the PE part 212. That is, when the water cooling type heat exchanger 305 operates in the evaporator mode, the water cooling type heat exchanger 305 may recover waste heat from the PE part 212 through a heat exchange operation.

Furthermore, when the air-conditioning circuit 300 operates in the cooling mode, if the water cooling type heat exchanger 305 functions as a condenser, a high-temperature and high-pressure refrigerant supplied by the air-conditioning circuit 300 delivers heat to a coolant while passing through the water cooling type heat exchanger 305. At this time, the heated coolant may warm up the PE part 212 by the refrigerant. That is, when the water cooling type heat exchanger 305 operates in the condenser mode, the coolant having a temperature raised by the refrigerant supplied by the air-conditioning circuit 300 may be supplied to the PE part 212, thus warming up the PE part 212.

If the upper hub 30 is rotated by 60° in the first direction, when the water cooling type heat exchanger 305 operates in the evaporator mode, the existing cooling system may operate in the heat pump mode.

As illustrated in FIG. 12, if the upper hub 30 is rotated by 180° in the first direction with respect to the reference state, the first upper flow channel 31 becomes a state in which it is coupled to the first upper nipple 11 and the fifth upper nipple 15 in a way that the coolant can flow through the first upper flow channel 31, the second upper flow channel 32 becomes a state in which it is coupled to the second upper nipple 12 and the sixth upper nipple 16 in a way that the coolant can flow through the second upper flow channel 32, and the third upper flow channel 33 becomes a state in which it is coupled to the third upper nipple 13 and the fourth upper nipple 14 in a way that the coolant can flow through the third upper flow channel 33.

Accordingly, the entrance-side coolant line ① of the first radiator 107 coupled to the first upper nipple 11 and the first entrance-side coolant line ⑤ of the water cooling type heat exchanger 305 coupled to the fifth upper nipple 15 communicate with each other through the first upper flow channel 31 in a way that the coolant can flow through the first upper flow channel 31. The exit-side coolant line ② of the first radiator 107 coupled to the second upper nipple 12 and the first exit-side coolant line ⑥ of the water cooling type heat exchanger 305 coupled to the sixth upper nipple 16 communicate with each other through the second upper flow channel 32 in a way that the coolant can flow through the second upper flow channel 32. The entrance-side coolant line ③ of the PE part 212 coupled to the third upper nipple 13 and the exit-side coolant line ④ of the PE part 212 coupled to the fourth upper nipple 14 communicate with each other through the third upper flow channel 33 in a way that the coolant can flow through the third upper flow channel 33.

Furthermore, accordingly, the PE part 212 becomes a state in which it is separated from the first radiator 107 and the water cooling type heat exchanger 305. Accordingly, when a temperature of the coolant is raised by heat autonomously generated in the PE part 212, the PE part 212 may be warmed up by the coolant having a temperature raised. The water cooling type heat exchanger 305 may be solely cooled by the coolant cooled through the first radiator 107.

In this case, the first radiator 107 and the water cooling type heat exchanger 305 become a state in which the first radiator 107 and the water cooling type heat exchanger 305 communicate with each other in a way that the coolant can flow through the first radiator 107 and the water cooling type heat exchanger 305. When operating in the evaporator mode, the water cooling type heat exchanger 305 recovers waste heat from external air through the coolant passing through the first radiator 107. Specifically, when the air-conditioning circuit 300 operates in the temperature-rising mode, if the water cooling type heat exchanger 305 functions as an evaporator, a low-temperature and low-pressure refrigerant supplied by the air-conditioning circuit 300 absorbs heat from the coolant while passing through the water cooling type heat exchanger 305. At this time, the coolant having a temperature lowered by the refrigerant recovers waste heat from the external air passing through the first radiator 107.

As described above, if the upper hub 30 is rotated by 180° in the first direction, a mode which cannot be performed in the existing cooling system can be performed.

As illustrated in FIG. 13, when a rotation angle of the lower hub 40 is 0°, that is, if an operating state of the lower hub 40 is the reference state, the first lower flow channel 41 becomes a state in which it is coupled to the second lower nipple 22 and the third lower nipple 23 in a way that the coolant can flow through the first lower flow channel 41, the second lower flow channel 42 becomes a state in which it is coupled to the fourth lower nipple 24 and the fifth lower nipple 25 in a way that the coolant can flow through the second lower flow channel 42, and the third lower flow channel 43 becomes a state in which it is coupled to the sixth lower nipple 26 and the first lower nipple 21 in a way that the coolant can flow through the third lower flow channel 43.

Accordingly, the exit-side coolant line ⑧ of the second radiator 206 coupled to the second lower nipple 22 and the entrance-side coolant line ⑨ of the battery part 213 coupled to the third lower nipple 23 communicate with each other through the first lower flow channel 41 in a way that the coolant can flow through the first lower flow channel 41. The exit-side coolant line ⑩ of the battery part 213 coupled to the fourth lower nipple 24 and the second entrance-side coolant line ⑪ of the water cooling type heat exchanger 305 coupled to the fifth lower nipple 25 communicate with each other through the second lower flow channel 42 in a way that the coolant can flow through the second lower flow channel 42. The second exit-side coolant line ⑫ of the water cooling type heat exchanger 305 coupled to the sixth lower nipple 26 and the entrance-side coolant line ⑦ of the second radiator 206 coupled to the first lower nipple 21 communicate with each other through the third lower flow channel 43.

Accordingly, the battery part 213 is coupled to the second radiator 206 and the water cooling type heat exchanger 305 in a way that the coolant can flow therethrough. The battery part 213 becomes a state in which it may be cooled by the coolant cooled through the second radiator 206.

Accordingly, if the lower hub 40 maintains the reference state, the integrated cooling mode can be performed on the battery part 213 of the existing cooling system.

As illustrated in FIG. 14, if the lower hub 40 is rotated by 300° in the second direction with respect to the reference state, the first lower flow channel 41 becomes a state in which it is coupled to the fourth lower nipple 24 and the fifth lower nipple 25 in a way that the coolant can flow through the first lower flow channel 41, the second lower flow channel 42 becomes a state in which it is coupled to the third lower nipple 23 and the sixth lower nipple 26 in a way that the coolant can flow through the second lower flow channel 42, and the third lower flow channel 43 becomes a state in which it is coupled to the first lower nipple 21 and the second lower nipple 22 in a way that the coolant can flow through the third lower flow channel 43.

Accordingly, the exit-side coolant line ⑩ of the battery part 213 coupled to the fourth lower nipple 24 and the second entrance-side coolant line ⑪ of the water cooling type heat exchanger 305 coupled to the fifth lower nipple 25 communicate with each other through the first lower flow channel 41 in a way that the coolant can flow through the first lower flow channel 41. The entrance-side coolant line ⑨ of the battery part 213 coupled to the third lower nipple 23 and the second exit-side coolant line ⑫ of the water cooling type heat exchanger 305 coupled to the sixth lower nipple 26 communicate with each other through the second lower flow channel 42 in a way that the coolant can flow through the second lower flow channel 42. The exit-side coolant line ⑧ of the second radiator 206 coupled to the second lower nipple 22 and the entrance-side coolant line ⑦ of the second radiator 206 coupled to the first lower nipple 21 communicate with each other through the third lower flow channel 43.

Accordingly, the battery part 213 becomes a state in which it is separated from the second radiator 206 and coupled to the water cooling type heat exchanger 305 in a way that the coolant can flow through the battery part 213 and the water cooling type heat exchanger 305. In this case, the battery part 213 cannot be cooled through the second radiator 206. The water cooling type heat exchanger 305 may recover waste heat from the battery part 213 or warm up the battery part 213 depending on its operating mode.

Specifically, when the water cooling type heat exchanger 305 operates in the evaporator mode, the water cooling type heat exchanger 305 may recover waste heat from the battery part 213 through a heat exchange with the refrigerant supplied by the air-conditioning circuit 300. Furthermore, when the water cooling type heat exchanger 305 operates in the condenser mode, the water cooling type heat exchanger 305 may warm up the battery part 213 by supplying, to the battery part 213, the coolant having a temperature raised by the refrigerant of the air-conditioning circuit 300.

As described above, if the lower hub 40 is rotated by 300° in the second direction, a mode which cannot be performed in the existing cooling system can be performed.

As illustrated in FIG. 15, if the lower hub 40 is rotated by 180° in the second direction with respect to the reference state, the first lower flow channel 41 becomes a state in which it is coupled to the fifth lower nipple 25 and the first lower nipple 21 in a way that the coolant can flow through the first lower flow channel 41, the second lower flow channel 42 becomes a state in which it is coupled to the sixth lower nipple 26 and the second lower nipple 22 in a way that the coolant can flow through the second lower flow channel 42, and the third lower flow channel 43 becomes a state in which it is coupled to the third lower nipple 23 and the fourth lower nipple 24 in a way that the coolant can flow through the third lower flow channel 43.

Accordingly, the second entrance-side coolant line ⑪ of the water cooling type heat exchanger 305 coupled to the fifth lower nipple 25 and the entrance-side coolant line ⑦ of the second radiator 206 coupled to the first lower nipple 21 communicate with each other through the first lower flow channel 41 in a way that the coolant can flow through the first lower flow channel 41. The second exit-side coolant line ⑫ of the water cooling type heat exchanger 305 coupled to the sixth lower nipple 26 and the exit-side coolant line ⑧ of the second radiator 206 coupled to the second lower nipple 22 communicate with each other through the second lower flow channel 42 in a way that the coolant can flow through the second lower flow channel 42. The exit-side coolant line ⑩ of the battery part 213 coupled to the fourth lower nipple 24 and the entrance-side coolant line ⑨ of the battery part 213 coupled to the third lower nipple 23 communicate with each other through the third lower flow channel 43.

Furthermore, accordingly, the battery part 213 becomes a state in which it is separated from the second radiator 206 and the water cooling type heat exchanger 305 in a way that the coolant cannot flow therethrough, and becomes a state in which it is coupled to only the second radiator 206 and the water cooling type heat exchanger 305 in a way that the coolant can flow therethrough.

In this case, when a temperature of the coolant is raised by heat autonomously generated in the battery part 213, the battery part 213 may be warmed up by the coolant having a temperature raised, or may be warmed up by the coolant having a temperature raised by the coolant heater 202. Furthermore, the battery part 213 may be cooled by the coolant cooled through the chiller 201. The chiller 201 is a component of the cooling system for cooling the coolant through a heat exchange with the refrigerant of the air-conditioning circuit 300.

Furthermore, in this case, since the coolant cooled through the second radiator 206 does not cool the battery part 213, the water cooling type heat exchanger 305 may recover waste heat from external air through the coolant passing through the second radiator 206. That is, when operating in the evaporator mode, the water cooling type heat exchanger 305 recovers a heat source from the external air through the second radiator 206.

Furthermore, the water cooling type heat exchanger 305 may be solely cooled by the coolant cooled through the second radiator 206.

Accordingly, if the lower hub 40 is rotated by 180° in the second direction, the separation cooling mode, etc. can be performed on the battery part 213 of the existing cooling system.

The upper hub 30 and the lower hub 40 can be independently rotated by the driving apparatus 50. If the double 6-way valve according to one form of the present disclosure is applied to a cooling system, various heat management modes can be performed compared to the existing cooling system by individually controlling rotation angles of the upper hub 30 and the lower hub 40.

For example, if both the upper hub 30 and the lower hub 40 maintain the reference state, if the upper hub 30 maintains the reference state and the lower hub 40 is rotated by 180° or 300°, if the upper hub 30 is rotated by 60° and the lower hub 40 is rotated by 180° or 300°, and if the upper hub 30 is rotated by 180° and the lower hub 40 is rotated by 180° or 300°, different cooling modes and different temperature-rising modes can be executed.

Furthermore, in order to cool the PE part 212 more intensively, as illustrated in FIG. 16, the upper hub 30 may be rotated by 345° in the first direction with respect to the reference state thereof, and the lower hub 40 may be rotated by 195° in the second direction with respect to the reference state thereof. In this case, as illustrated in FIGS. 16 to 18, the bottom 34b of the first upper half flow channel 34 and the top 44a of the first lower half flow channel 44 are coupled in a way that the coolant can flow through the first upper half flow channel 34 and the first lower half flow channel 44.

Furthermore, if the upper hub 30 is rotated by 345° and the lower hub 40 is rotated by 195°, the top 34a of the first upper half flow channel 34 is coupled to the second upper nipple 12, and the bottom 44b of the first lower half flow channel 44 is coupled to the first lower nipple 21.

Furthermore, when the bottom 34b of the first upper half flow channel 34 and the top 44a of the first lower half flow channel 44 are coupled, the bottom 35b of the second upper half flow channel 35 and the top 45a of the second lower half flow channel 45 are also coupled.

If the upper hub 30 is rotated by 345° and the lower hub 40 is rotated by 195°, the bottom 35b of the second upper half flow channel 35 and the top 45a of the second lower half flow channel 45 are coupled in a way that the coolant can flow through the second upper half flow channel 35 and the second lower half flow channel 45. The top 35a of the second upper half flow channel 35 is coupled to the third upper nipple 13. The bottom 45b of the second lower half flow channel 45 is coupled to the second lower nipple 22.

Accordingly, the first radiator 107 and the second radiator 206 are coupled in a way that the coolant can flow through the first radiator 107 and the second radiator 206. The PE part 212 is coupled to the first radiator 107, the second radiator 206, and the water cooling type heat exchanger 305 in a way that the coolant can flow therethrough.

Accordingly, the coolant that passes through the first radiator 107 and the second radiator 206 flows into the water cooling type heat exchanger 305 via the PE part 212. Accordingly, the PE part 212 may be cooled by both the first radiator 107 and the second radiator 206 at the same time. As a result, compared to a case where the PE part 212 is cooled using only the first radiator 107 in the existing cooling system, the PE part 212 can be cooled more intensively, and cooling efficiency of the PE part 212 can be improved.

Furthermore, in order to cool the battery part 213 more intensively, as illustrated in FIG. 19, the upper hub 30 may be rotated by 45° in the first direction with respect to the reference state thereof and the lower hub 40 may be rotated by 15° the second direction with respect to a reference state thereof. In this case, as illustrated in FIGS. 19 to 21, the bottom 36b of the third upper half flow channel 36 and the top 46a of the third lower half flow channel 46 are coupled in a way that the coolant can flow through the third upper half flow channel 36 and the third lower half flow channel 46.

Furthermore, if the upper hub 30 is rotated by 45° and the lower hub 40 is rotated by 15°, the top 36a of the third upper half flow channel 36 is coupled to the second upper nipple 12, and the bottom 46b of the third lower half flow channel 46 is coupled to the first lower nipple 21.

Furthermore, when the bottom 36b of the third upper half flow channel 36 and the top of the third lower half flow channel 46 are coupled, the bottom 37b of the fourth upper half flow channel 37 and the top 47a of the fourth lower half flow channel 47 are also coupled.

If the upper hub 30 is rotated by 45° and the lower hub 40 is rotated by 15°, the bottom 37b of the fourth upper half flow channel 37 and the top 47a of the fourth lower half flow channel 47 are coupled in a way that the coolant can flow through the fourth upper half flow channel 37 and the fourth lower half flow channel 47. The top 37a of the fourth upper half flow channel 37 is coupled to the first upper nipple 11. The bottom 47b of the fourth lower half flow channel 47 is coupled to the sixth lower nipple 26.

Accordingly, the first radiator 107 and the second radiator 206 are coupled in a way that the coolant can flow therethrough. At the same time, the battery part 213 is coupled to the first radiator 107, the second radiator 206, and the water cooling type heat exchanger 305 in a way that the coolant can flow therethrough.

Accordingly, the coolant passing through the first radiator 107 and the second radiator 206 flows into the water cooling type heat exchanger 305 via the battery part 213. Accordingly, the battery part 213 can be cooled by both the first radiator 107 and the second radiator 206 at the same time. As a result, the battery part 213 can be cooled more intensively and cooling efficiency of the battery part 213 can be improved compared to a case where the battery part 213 is cooled using only the second radiator 206 in the existing cooling system.

As described above, by applying the double 6-way valve according to another form of the present disclosure to the cooling system for an electric vehicle, the integrated cooling mode and the separation cooling mode can be easily performed in addition to the heat pump mode and the battery temperature-rising mode according to an operation of the double 6-way valve of the existing cooling system. Furthermore, various cooling modes and the temperature-rising mode based on rotation angles of the upper hub 30 and the lower hub 40 can be additionally performed.

The present disclosure provides the following major effects through the aforementioned solving means.

First, a plurality of 3-way valves, bypass lines, and T tubes applied for flow control of a coolant in a conventional technology can be integrated and substituted with one double 6-way valve. Accordingly, compared to the existing cooling system, a reduction in the number of parts and a reduction in the number of assembly processes can be realized, a reduction in weight and a reduction in a prime cost can be realized, the simplification and advantages of a package configuration can be provided, and flow control of a coolant for target parts to be cooled, such as the PE part and the battery part, can be smoothly performed.

Second, more various cooling modes and the temperature-rising modes in the cooling system can be performed depending on an operating mode of the double 6-way valve. Accordingly, heat of an electric vehicle can be efficiently managed. As a result, curb weight of the electric vehicle can be improved.

Third, a coolant can be guided to flow only in a desired direction. Accordingly, a phenomenon in which a coolant is introduced into another place without flowing into a designated flow direction in the existing T tube, etc. can be inhibited or prevented.

While the exemplary forms of the present disclosure have been described above in detail, the terms and words used in the present specification and claims should not be construed as being limited to the ordinary or dictionary meanings, and in addition, the configurations illustrated in the exemplary forms and drawings described in the present specification are only exemplary forms of the present disclosure, so that the scope of the present disclosure is not limited to the aforementioned exemplary forms, and various modifications and improvements by those skilled in the art using the basic concept of the present disclosure defined in the appended claims are also included in the scope of the present disclosure.

What is claimed is:

1. A double 6-way valve for a vehicle cooling system, the double 6-way valve comprising:
    an upper housing including a plurality of upper nipples disposed at equal intervals on an outer circumference surface thereof, wherein the plurality of upper nipples is coupled to and supported by first parts of the cooling system;
    a lower housing stacked under the upper housing and including a plurality of lower nipples disposed at equal intervals on an outer circumference surface thereof, wherein the plurality of lower nipples is coupled to and supported by second parts of the cooling system;
    an upper hub rotatably mounted within the upper housing;
    a plurality of upper flow channels independently provided within the upper hub and each coupled to two upper nipples, among the plurality of upper nipples, selected based on a rotation angle of the upper hub, such that a coolant flows through each upper flow channel of the plurality of upper flow channels;
    a lower hub rotatably mounted within the lower housing and stacked under the upper hub;
    a plurality of lower flow channels independently provided within the lower hub and each coupled to two lower nipples, among the plurality of lower nipples, selected based on a rotation angle of the lower hub, such that the coolant flows through each lower flow channel of the plurality of lower flow channels; and
    a driving apparatus configured to rotate the upper hub and the lower hub.

2. The double 6-way valve of claim 1, wherein the plurality of upper flow channels comprises:

a first upper flow channel coupled to two upper nipples, among the plurality of upper nipples, selected based on a rotation angle of the upper hub, and configured to enable the selected two upper nipples to communicate with each other such that the coolant flows through the first upper flow channel;

a second upper flow channel disposed at a predetermined distance from the first upper flow channel in a circumference direction of the upper hub, coupled to two upper nipples, among the plurality of upper nipples, selected based on a rotation angle of the upper hub, and configured to enable the selected two upper nipples to communicate with each other such that the coolant flows through the second upper flow channel; and a third upper flow channel disposed at a predetermined distance from the second upper flow channel in the circumference direction of the upper hub, coupled to remaining two upper nipples not coupled to the first upper flow channel and the second upper flow channel, among the plurality of upper nipples, and configured to enable the remaining two upper nipples to communicate with each other such that the coolant flows through the third upper flow channel.

3. The double 6-way valve of claim 2, wherein when the rotation angle of the upper hub is a zero degree (0°), the first upper flow channel is coupled to a second upper nipple and a third upper nipple of the plurality of upper nipples such that the coolant flows through the first upper flow channel, the second upper flow channel is coupled to a fourth upper nipple and a fifth upper nipple of the plurality of upper nipples such that the coolant flows through the second upper flow channel, and the third upper flow channel is coupled to a first upper nipple and a sixth upper nipple of the plurality of upper nipples such that the coolant flows through the third upper flow channel.

4. The double 6-way valve of claim 3, wherein:

a first upper half flow channel and a second upper half flow channel which are independently formed are provided within the upper hub and each extended from an outer circumference surface of the upper hub to a bottom of the upper hub, a first lower half flow channel and a second lower half flow channel which are independently formed are provided within the lower hub and each extended from an outer circumference surface of the lower hub to a top of the lower hub, based on rotation angles of the upper hub and the lower hub, a bottom of the first upper half flow channel and a top of the first lower half flow channel are selectively coupled such that the coolant flows through the first upper half flow channel and the first lower half flow channel, and a bottom of the second upper half flow channel and a top of the second lower half flow channel are selectively coupled in such that the coolant simultaneously flows through the second upper half flow channel and the second lower half flow channel, a top of the first upper half flow channel and a top of the second upper half flow channel are coupled to upper nipples, among the plurality of upper nipples, selected based on the rotation angle of the upper hub, respectively, such that the coolant flows through the first upper half flow channel and the second upper half flow channel, and a bottom of the first lower half flow channel and a bottom of the second lower half flow channel are coupled to lower nipples, among the plurality of lower nipples, selected based on the rotation angle of the lower hub, respectively, such that the coolant flows through the first lower half flow channel and the second lower half flow channel.

5. The double 6-way valve of claim 4, wherein:

the top of the first upper half flow channel is coupled to the second upper nipple, among the plurality of upper nipples, selected based on a predetermined rotation angle of the upper hub such that the coolant flows through the first upper half flow channel, and the top of the second upper half flow channel is coupled to the third upper nipple, among the plurality of upper nipples, selected based on a predetermined rotation angle of the upper hub such that the coolant flows through the second upper half flow channel.

6. The double 6-way valve of claim 5, wherein:

the bottom of the first lower half flow channel is coupled to a first lower nipple, among the plurality of lower nipples, selected based on a rotation angle of the lower hub such that the coolant flows through the first lower half flow channel, and the bottom of the second lower half flow channel is coupled to a second lower nipple, among the plurality of lower nipples, selected based on a rotation angle of the lower hub such that the coolant flows through the second lower half flow channel.

7. The double 6-way valve of claim 4, wherein:

a third upper half flow channel and a fourth upper half flow channel which are independently formed are provided within the upper hub and each extended from the outer circumference surface of the upper hub to the bottom of the upper hub, a third lower half flow channel and a fourth lower half flow channel which are independently formed are provided within the lower hub and each extended from the outer circumference surface of the lower hub to the top of the lower hub, based on the rotation angles of the upper hub and the lower hub, a bottom of the third upper half flow channel and a top of the third lower half flow channel are selectively coupled such that the coolant flows through the third upper half flow channel and the third lower half flow channel, and a bottom of the fourth upper half flow channel and a top of the fourth lower half flow channel are selectively coupled such that the coolant simultaneously flows through the fourth upper half flow channel and the fourth lower half flow channel, a top of the third upper half flow channel and a top of the fourth upper half flow channel are coupled to upper nipples, among the plurality of upper nipples, selected based on a rotation angle of the upper hub, respectively, such that the coolant flows through the third upper half flow channel and the fourth upper half flow channel, and a bottom of the third lower half flow channel and a bottom of the fourth lower half flow channel are coupled to lower nipples, among the plurality of lower nipples, selected based on a rotation angle of the lower hub, respectively, such that the coolant flows through the third lower half flow channel and the fourth lower half flow channel.

8. The double 6-way valve of claim 7, wherein:

the top of the third upper half flow channel is coupled to the second upper nipple, among the plurality of upper nipples, selected based on a predetermined rotation angle of the upper hub such that the coolant flows through the third upper half flow channel, and the top of the fourth upper half flow channel is coupled to the first upper nipple, among the plurality of upper nipples, selected based on a rotation angle of the upper hub such that the coolant flows through the fourth upper half flow channel.

9. The double 6-way valve of claim 8, wherein:

the bottom of the third lower half flow channel is coupled to a first lower nipple, among the plurality of lower nipples, selected based on a predetermined rotation angle of the lower hub such that the coolant flows through the third lower half flow channel, and the bottom of the fourth lower half flow channel is coupled to a fifth lower nipple, among the plurality of lower nipples, selected based on a predetermined rotation angle of the lower hub such that the coolant flows through the fourth lower half flow channel.

10. The double 6-way valve of claim 1, wherein the plurality of lower flow channels comprises:

a first lower flow channel coupled to two lower nipples, among the plurality of lower nipples, selected based on a rotation angle of the lower hub, and configured to enable the selected two lower nipples to communicate with each other such that the coolant flows through the first lower flow channel;

a second lower flow channel disposed at a predetermined distance from the first lower flow channel in a circumference direction of the lower hub, coupled to two lower nipples, among the plurality of lower nipples, selected based on a rotation angle of the lower hub, and configured to enable the selected two lower nipples to communicate with each other such that the coolant flows through the second lower flow channel; and a third lower flow channel disposed at a predetermined distance from the second lower flow channel in the circumference direction of the lower hub, coupled to remaining two lower nipples not coupled to the first lower flow channel and the second lower flow channel, among the plurality of lower nipples, and configured to enable the remaining two lower nipples to communicate with each other such that the coolant flows through the third lower flow channel.

11. The double 6-way valve of claim 10, wherein when the rotation angle of the lower hub is a zero degree (0°), the first lower flow channel is coupled to a second lower nipple and a third lower nipple of the plurality of lower nipples such that the coolant flows through the first lower flow channel, the second lower flow channel is coupled to a fourth lower nipple and a fifth lower nipple of the plurality of lower nipples such that the coolant flows through the second lower flow channel, and the third lower flow channel is coupled to a sixth lower nipple and a first lower nipple of the plurality of lower nipples such that the coolant flows through the third lower flow channel.

12. The double 6-way valve of claim 1, wherein:

a first upper nipple of the plurality of upper nipples is coupled to an entrance-side coolant line of a first radiator among components of the cooling system, and a second upper nipple of the plurality of upper nipples is coupled to an exit-side coolant line of the first radiator among the components of the cooling system.

13. The double 6-way valve of claim 12, wherein:

a third upper nipple of the plurality of upper nipples is coupled to an entrance-side coolant line of a power electronic (PE) part among components of the cooling system, and a fourth upper nipple of the plurality of upper nipples is coupled to an exit-side coolant line of the PE part among the components of the cooling system.

14. The double 6-way valve of claim 13, wherein:

a fifth upper nipple of the plurality of upper nipples is coupled to a first entrance-side coolant line of a water cooling type heat exchanger coupled to a first radiator among components of the cooling system, and a sixth upper nipple of the plurality of upper nipples is coupled to a first exit-side coolant line of the water cooling type heat exchanger coupled to the first radiator among the components of the cooling system.

15. The double 6-way valve of claim 1, wherein:

a first lower nipple of the plurality of lower nipples is coupled to an entrance-side coolant line of a second radiator among components of the cooling system, and a second lower nipple of the plurality of lower nipples is coupled to an exit-side coolant line of the second radiator among the components of the cooling system.

16. The double 6-way valve of claim 15, wherein:

a third lower nipple of the plurality of lower nipples is coupled to an entrance-side coolant line of a battery part among components of the cooling system, and a fourth lower nipple of the plurality of lower nipples is coupled to an exit-side coolant line of the battery part among the components of the cooling system.

17. The double 6-way valve of claim 16, wherein:

a fifth lower nipple of the plurality of lower nipples is coupled to a second entrance-side coolant line of a water cooling type heat exchanger coupled to a second radiator among components of the cooling system, and a sixth lower nipple of the plurality of lower nipples is coupled to a second exit-side coolant line of the water cooling type heat exchanger coupled to the second radiator among the components of the cooling system.

18. The double 6-way valve of claim 1, wherein the driving apparatus comprises:

a motor configured to be rotatable in a first direction and a second direction;

a first ratchet provided as a structure in which a first latch jaw and a first inclined plane are repeatedly formed on an outer circumference surface thereof in a circumference direction and mounted on a shaft of the motor;

a first spring clip configured to have a first end mounted on the upper hub and a second end seated in the first inclined plane in a way to be latched onto the first latch jaw;

a second ratchet provided as a structure in which a second latch jaw and a second inclined plane are repeatedly formed on an outer circumference surface thereof in a circumference direction and mounted on the shaft of the motor; and a second spring clip configured to have a first end mounted on the lower hub and a second end seated in the second inclined plane in a way to be latched onto the second latch jaw.

\* \* \* \* \*